United States Patent [19]

Tanimoto et al.

[11] Patent Number: 4,622,632

[45] Date of Patent: Nov. 11, 1986

[54] DATA PROCESSING SYSTEM HAVING A PYRAMIDAL ARRAY OF PROCESSORS

[75] Inventors: Steven L. Tanimoto; Joseph J. Pfeiffer, Jr., both of Seattle, Wash.

[73] Assignee: Board of Regents, University of Washington, Seattle, Wash.

[21] Appl. No.: 409,348

[22] Filed: Aug. 18, 1982

[51] Int. Cl.[4] ..................... G06F 15/16; G06F 15/66
[52] U.S. Cl. ................................................ 364/200
[58] Field of Search ... 364/200 MS File, 900 MS File

[56] References Cited

U.S. PATENT DOCUMENTS 4,174,514  11/1979  Sternberg ..................... 364/200 X

OTHER PUBLICATIONS

Dyer, "A Quadtree Machine for Parallel Image Processing", Workshop on Picture Data Description and Management, Pacific Grove, California (Aug. 27–29, 1980).
Batcher, "Design of a Massively Parallel Processor", IEEE Transactions on Computers, vol. C-29, No. 9, pp. 836–840, (Sep. 1980).
Tanimoto et al., "A Hierarchical Data Structure for Picture Processing", Computer Graphics and Image Processing, 4, 104–119, (1975).
Hanson et al., "The Design of a Semantically Directed Vision Processor", Coins Technical Report 75C-1, (Feb. 1975).
Sequin et al., "Communication in X-Tree, a Modular Multiprocessor System", Computer Science Division, Electrical Engineering and Computer Sciences, University of California, Berkeley, California (1978).
Deruyck et al., "Processor Displacement: An Area--Time Tradeoff Method for VLSI (date unknown).
Bentley et al., "A Tree Machine for Searching Problems (date unknown).
Duff, "Clip 4" a Large Scale Integrated Circuit Array Parallel Processor (date unknown).
Uhr, "Layered 'Recognition Cone' Networks that Preprocess, Classify and Describe", IEEE Transactions on Computers, pp. 758–768, (Jul. 1972).
Jackins et al., "Oct-Trees and Their use in Representing Three Dimensional Objects", Department of Computer Science, University of Washington, Seattle, Washington, Technical Report No. 79-07-06.

*Primary Examiner*—James R. Hoffman
*Attorney, Agent, or Firm*—Finnegan, Henderson, Farabow, Garrett & Dunner

[57] ABSTRACT

A pyramidal data processing system comprising a plurality of levels of processor arrays, the number of processors in an array increases in number from a level of lowest resolution to a level of highest resolution. Each processor in an array is coupled for data transfer to a neighborhood of processors including laterally and diagoally adjacent processors in the same level, a processor in the level of next lowest resolution, and processors in the level of next greatest resolution. A memory is associated with each processor to store value of data elements. A controller and control memory generate control signals to perform in synchrony data transformations on selected data elements associated with each neighborhood of processors.

26 Claims, 18 Drawing Figures

LEVEL 5

DATA PROCESSING SYSTEM HAVING A PYRAMIDAL ARRAY OF PROCESSORS

FIELD OF THE INVENTION

This invention relates with particularity to a computer system for operating upon pyramidal data structures.

BACKGROUND OF THE INVENTION

Computer perception and processing of visual images is important for many applications such as assembly line automation, space exploration, medicine, earth resources monitoring, computer graphics, and other spatially oriented problems. The goal is to have a machine recognize and distinguish patterns on the basis of image information. The images are usually obtained from a video scanner or solid-state camera and necessarily include many data points to enable object recognition. Moreover, picture processing operations must be applied throughout the image to extract edge, texture, and other information that can be further processed, classified, or matched against a pattern dictionary. The computationally intensive requirements of image manipulation place heavy demands on traditional computers resulting in extended processing times. Consequently, the image data processing portion of computer visual identification commonly forms a bottleneck in the image identification process.

A proposed solution to the computational bottleneck is a move away from serial processing by a general purpose computer toward parallel processing by means of a real or a simulated (pipelined) parallel image processor. Such systems are indeed capable of reducing processing time. Nonetheless, greater parallelism in processing through the use of a multitude of processors coupled in parallel necessarily inflates the initial system cost and greatly complicates implementation. On the other hand, pipelined computations minimize initial system cost, but only proceed at a rate as fast as the pipelined processor can complete individual operations and move onto successive ones.

In some system architectures there are delays that result from the communication of data rather than from the processing of data. For example, if a significant amount of data must be transferred onto or off of semiconductor chips embodying the processors, the data transfers may have to be done serially if there are not enough data transfer ports or pins on the chip for the data to be transferred completely in parallel. In these systems, the advantages of coupling a plurality of processors in parallel are curtailed since the processing time saved as a result of parallel processing is lost in waiting for data to be transferred to and from the chips.

As a modified approach to information processing, when a large amount of data is available in array form, image processing systems have been developed which respond to both global and local trends in the image data. Data structures have been proposed to facilitate such processing. Examples of such data structures are pyramids, quad-trees, hexaconal, cones, and regular decompositions. The computational bases for each of these data structures are similar. For example, a pyramid is a collection of images of the same scene arranged in levels (each with a different degree of resolution or spatial detail) with the most detailed image, i.e., the image including the most data points or elements, residing at the bottom level of the pyramid.

One of the basic operations in image processing that can be improved by using a hierarchical approach is edge detection. Ordinary edge detectors are algorithms that look only at small, local neighborhoods of a point at one time to determine if an edge of an object passes through that point. Noise from the image sensor tends to be localized and cause the use of a purely local neighborhood to produce numerous spurious edges and result in the overlooking of important edges. In a hierarchical data structure more global context can be easily utilized so that data representations of the image at various resolution levels can be combined to give reliable edge information.

The typical pyramid hierarchical data structure can be defined as a sequence of picture data arrays of the same view at different levels of resolution:

$$P = (A0, A1, A2, \ldots, AL)$$

where A0 is a one by one array, A1 is a two-by-two array, A2 is a four by four array, and AL is a $2^L$ by $2^L$ array. Such a pyramid of image data is constructed by taking a $2^L$ by $2^L$ image and storing it into an array, AL. The array of next lowest resolution, $AL-1$, can be obtained by utilizing linear or non-linear functions on two-by-two blocks of image data cells or data elements in the array AL (non-overlapping blocks) to obtain values for each data cell in array $AL-1$. Useful functions may include, for example, an average of the two-by-two block, the maximum or minimum value in the block, the median value in the block, or other functions.

Such a pyramid data structure finds application in many areas including edge detection, hierarchical searching, region growing, statistical classification, and computer graphics. However, the utilization of a hierarchical data structure such as a pyramid does not alone solve the problems resulting from the adoption of either a parallel or pipelined processing structure. If in such a pyramid data structure, a processor is dedicated to each cell (data point or element) in the image array at each level of data resolution, the number of interconnection lines among the same level processors and between the same level processors and global neighbor processors becomes unworkable. Moreover, since there are very large numbers of processors to be interconnected, the number of communication lines increases to a point not feasible for interconnection with a single chip. Also, a one-to-one correspondence between processors and unit cells places an upper limit on the number of cells per image because of the large area and power requirements of a large plurality of such processors.

The net result is that hierarchical data structures implemented by parallel processors in one-to-one correspondence with data cells forming arrays of differing resolutions, have in the past been plagued with unresolved problems. The problems which have stood in the way of success, before the instant invention, include high cost, unreliability because of high complexity, heat dissipation problems, and limitations on data transfer rates between processor chips.

OBJECTS AND SUMMARY OF THE INVENTION

It is, therefore, an object of the present invention to implement a hierarchical data structure in a manner which reduces the number of communication lines necessary between processors at various levels of the data structure.

It is a further object of the present invention to provide for rapid data transfer among processors in the same image resolution level and between such processors and neighboring processors.

Another object of this invention is to implement a pyramidal data structure through the use of parallel data processors formed as highly regular structures on semiconductor integrated circuit chips.

Yet another object of this invention is to facilitate the extension of the degree of resolution obtainable in a hierarchical data structure through the use of a plurality of parallel processors each associated with a plurality of data storage elements.

Still another object of this invention is to implement a hierarchical data structure by parallel processors which are supplied with data at a rate to enable operation at or near their optimum cycle times.

Another object of this invention is to utilize multiplexed data communications among processors in a global neighborhood.

These and other objects are obtained by a pyramidal parallel processing system comprising a first processor level including at least one processor, the first level processor having associated therewith first memory means for storing a first data matrix in a first plurality of data storage elements; a second processor level including a plurality of processors coupled in parallel, the second level processors having associated therewith second memory means for storing a second data matrix in a second plurality of data storage elements, each of the first data storage elements and the second data storage elements having associated values and each of the second data storage elements having associated therewith a neighborhood comprising the second data storage element itself, second data storage elements adjacent thereto in the second data matrix, and at least one of the first data storage elements in the first data matrix; means for transferring the values stored in the first data storage elements to the plurality of second level processors; and means for individually controlling the second level processors to generate in parallel a transformation value for each of the values stored in the second data storage elements corresponding to a function of the values stored in the second data storage elements and the first data storage element included in the neighborhood of the second data storage element.

DETAILED DESCRIPTION OF THE PREFERRED EMBODIMENT

Figure 1:
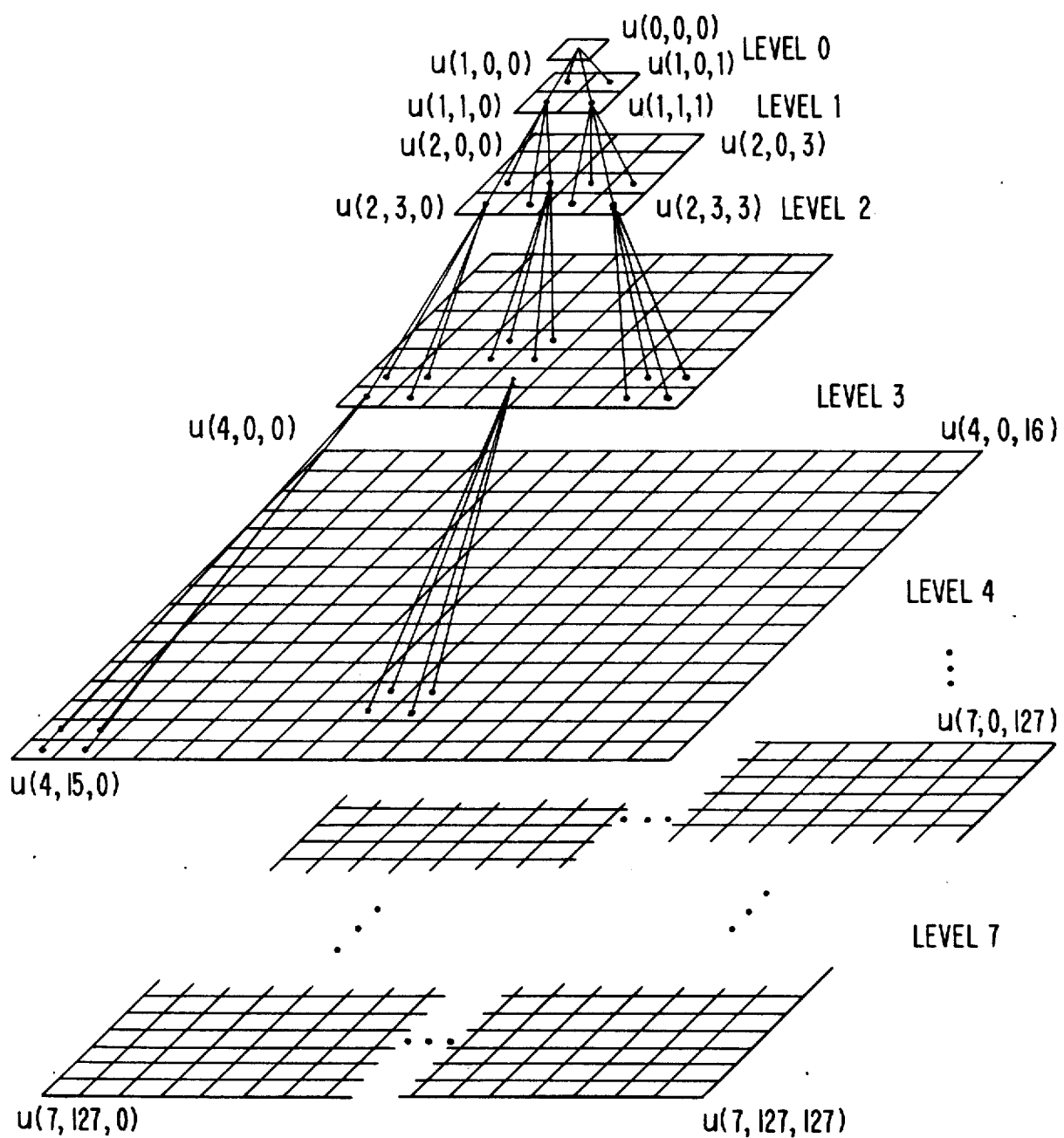
FIG. 1 is a schematic illustration of a pyramidal data structure processable by the instant invention.

FIG. 1 is a schematic illustration of a hierarchical data structure as employed in the pyramidal processing system of the instant invention. In FIG. 1, an image is represented in eight degrees of resolution ranging from a level of highest resolution, Level 7, to a level of lowest resolution, Level 0. Each level L of the pyramidal data structure comprises $4^L$ unit cells. Consequently, Level 0 has a single unit cell, Level 1 has 4 unit cells, Level 2 has 16 unit cells, and so forth with Level 7 having 16,384 unit cells.

The unit cells in a level L are labelled U(L, i, j), where i and j may each vary from 0 to $2^L - 1$. The single unit cell in Level 0 is therefore labelled U(0, 0, 0), the unit cells at Level 1 are labelled U(1, 0, 0), U(1, 0, 1), U(1, 1, 0), and U(1, 1, 1), and so forth until the unit cells at Level 7 are labelled U(7, 0, 0), U(7, 0, 127), ... U(7, 127, 0) ... U(7, 127, 127).

The number of unit cells at a particular level is referred to as the resolution of that level. In the context of the pyramidal structure for a particular level L, and level L−1 is the level immediately "above" the level L, and the level L+1 is the level immediately "below" the level L.

Value at Each Unit Cell

A numerical value is associated with each unit cell U(L, i, j) in the pyramidal data structure. The value associated with each unit cell will contain such things as a numerical representation of the optical properties of a corresponding part of a visual scene. In the level of highest resolution, each unit cell may contain one pixel value from a source image (when speaking in terms of image processing). As an analogy in the field of image processing, the different levels within the pyramidal data structure are like viewing the image under different powers of magnification with the greatest level of resolution corresponding to the highest magnification power.

The Neighborhood of a Cell

Each unit cell in each level includes a local neighborhood of thirteen adjacent unit cells, referred to as the context of that cell. Eight of these neighbor cells occur in the same level as the cell under consideration. The eight neighbor cells of a given cell $U(L, i, j)$ in Level L are the eight cells $U(L, i-1, j-1)$, $U(L, i, j-1)$, $U(L, i+1, j-1)$, $U(L, i-1, j)$, $U(L, i+1, j)$, $U(L, i-1, j+1)$, $U(L, i, j+1)$, and $U(L, i+1, j+1)$. For completeness, a cell $U(L, i, j)$ is often said to be in its own local neighborhood, in which case the local neighborhood of a cell $U(L, i, j)$ in level L may be considered to be the nine cells $U(L, i-1, j-1)$ through $U(L, i+1, j+1)$.

Of the remaining five unit cells in the context of the cell, one occurs in the level immediately above the cell under consideration (the "father" of the cell) and four in the level immediately below it (the "sons"). For a given data unit cell $U(L, i, j)$, the father is the data unit cell $U(L-1, i\ div\ 2, j\ div\ 2)$ (where "div" is truncated integer division), and the sons are the cells $U(L+1, 2^*i, 2^*j)$, $U(L+1, 2^*i, 2^*j+1)$, $U(L+1, 2^*i+1, 2^*j)$, and $U(L+1, 2^*i+1, 2^*j+1)$. Note that the cell is the father of each of its four sons, and that it is also one of the sons of its own father.

Relationships Within Neighborhoods

The relationship between a unit cell in a particular level, e.g., the unit cell labelled $U(2, 3, 1)$ in Level 2, to its son unit cells in the next adjacent level of higher resolution, i.e., unit cells labelled $U(3, 6, 2)$, $U(3, 6, 3)$, $U(3, 7, 2)$ and $U(3, 7, 3)$ in Level 3, is determined by software and is not fixed. For example, if each of the unit cells in Level 4 has associated therewith a gray scale value corresponding to image data supplied to the pyramidal processing system, the values associated with each set of four unit cells having a common father may be averaged to generate a value for their father unit cell in the next level of lower resolution. Accordingly, the gray scale values of the unit cells labelled with $U(4, 6, 2)$, $U(4, 6, 3)$, $U(4, 7, 2)$ and $U(4, 7, 3)$ in Level 4 may be averaged and assigned to the unit cell labelled $U(3, 3, 1)$ in Level 3. Similarly, the value of the unit cell labelled $U(0, 0, 0)$ in level 0 may be assigned the average of the values assigned to the level 1 unit cells labelled $U(1, 0, 0)$, $U(1, 0, 1)$, $U(1, 1, 0)$, and $U(1, 1, 1)$. As stated above, this relationship is not fixed: the value of a cell might equally well be given the maximum value assigned to any of its son unit cells. In addition, the value of the son cells may be determined by that of their father, or a combination of the values of the individual cells, their sons, their fathers, or other cells in their neighborhoods.

Figure 2:
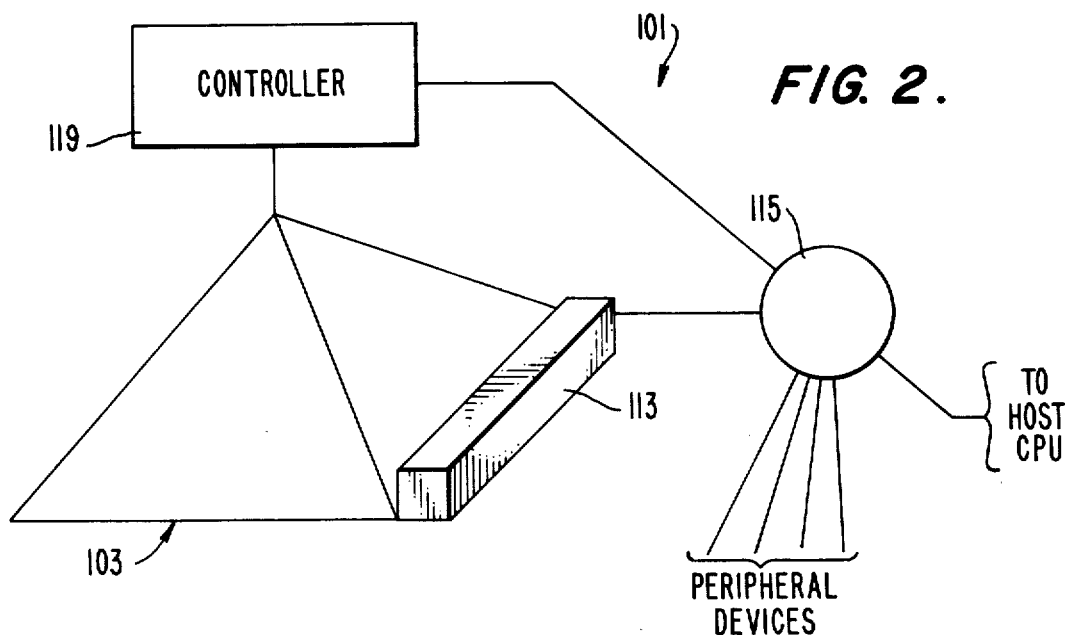
FIG. 2 is a block diagram illustration of the pyramidal processing system of the instant invention.

FIG. 2 is a schematic illustration of the pyramidal processing system of the instant invention. As embodied herein, the pyramidal processing system 101 includes a pyramidal processing unit 103 for processing a hierarchical data structure (which will be described in detail later), a host computer, various peripheral devices for input and output to the pyramidal processing system, and a system intercommunications circuit 115 for communications between the various components of the pyramidal processing system.

All of the components of the pyramidal processing system communicate through the use of the system intercommunications circuit 115. This may be embodied as a crossbar switch, a bus, a ring network, or other communication means.

A data input-output register 113 is connected to the base level (greatest resolution), Level 7, of the pyramidal processing unit. The data input-output register 113 transfers data received from the system intercommunications circuit 115 to the processor Level 7.

Data for the pyramidal processing unit 103 may be supplied from any of a number of peripheral devices which may consist, for example, of television cameras, optical scanning units, charge coupled device sensors, infra-red detectors, or other sources of image data or non-image data expressed in matrix or array form. It is also possible to transfer array data for entry into the greatest resolution level of the pyramidal processor from a host computer through the system intercommunications circuit 115. Such a source of data finds particular application when the pyramidal processing system is being used to process data which has been collected and stored off-line.

Similarly, data which has been processed by the pyramidal processing unit 103 may be transmitted to the system intercommunications circuit 115 through the use of the input-output register 113 for use by such peripheral devices as graphic displays.

The system intercommunications circuit 115 is also connected to a controller 119. The manner in which control of the pyramidal processing system 101 is effected by the controller 119 will be explained below.

As stated above, in the described embodiment of the invention the pyramidal processor unit includes 8 levels, Level 0 through Level 7. The processor level 0 of lowest data resolution corresponds to Level 0 of the pyramidal data structure of FIG. 1. The data resolutions of Levels 1, 2, 3, 4, 5, 6 and 7 increases proportionately with processor Level 7 being the level of greatest data resolution. A data element in the pyramidal processing unit 103 corresponds exactly with a unit cell in the pyramidal data structure. As with the pyramidal data structure, there are $4^L$ data elements, at each level L in the pyramidal processing unit 103. Each data element is a value, e.g., gray scale value, associated with its corresponding unit cell in the hierarchical data structure. The definitions in the neighborhoods of cells in the pyramidal processing unit also correspond exactly with those in the pyramidal data structure.

Composition of a Cell in the Pyramidal Processing Unit

A unit cell in the pyramidal procesing unit comprises three data storage registers, labelled P, T, and C, a virtual processor V, and 512 bits of associated external storage. For a given unit cell in the pyramidal processing unit $U(L, i, j)$, the data storage registers are labelled $P(L, i, j)$, $T(L, i, j)$, and $C(L, i, j)$, and the virtual processor is labelled $V(L, i, j)$. A bit in the external memory location associated with the unit cell is labelled $MB(L, i, j, k)$, where k may take any value from 0 to 511, inclusive. The 512 bits of external memory associated with the unit cell are referred to collectively as $M(L, i, j)$.

The P, or Propagate, register labelled P(L, i, j) is used for communications between a unit cell U(L, i, j) and other data unit cells within its context as defined above.

The T, or Transient, register labelled T(L, i, j) is used as a data buffer between the virtual processor V(L, i, j) and the memory M(L, i, j) associated with the unit cell U(L, i, j).

The C, or Control, register labelled C(L, i, j) is used for selectively disabling the virtual processor V(L, i, j) of the unit cell U(L, i, j).

As explained more specifically below, the virtual processor V(L, i, j) of the unit cell U(L, i, j) consists of a pattern matching unit and a number of output buffers and output routing switches. The virtual processor V(L, i, j) is capable of performing the following three operations:

Pattern Match

The virtual processor V(L, i, j) is given a pattern consisting of fifteen ternary digits B($-1$, 0, 0), B(0, $-1$, $-1$) through B(0, 1, 1), B(1, 0, 0) through B(1, 1, 1) and B(T), which is matched against an extended context of the unit cell consisting of the contents of the propagate registers of the fourteen elements of the neighborhood of the unit cell and the current contents of the transient register of the unit cell. For each element in the context of the unit cell U(L, i, j), the match element B(l, m, n) is compared with the contents of the propagate register P(L+1, $i*2^l+m$, $j*2^l+n$), and the match element B(T) is compared against the contents of the transient register T(L, i, j), generating a Boolean result of 0 or 1.

The three values of the ternary digits are interpreted as:

0—the appropriate element of the extended neighborhood must be 0,

1—the appropriate element of the extended neighborhood must be 1, or

X—the appropriate element of the extended neighborhood may be either 0 or 1.

The result of the pattern match operation is either 1 (signifying that each and every element of the pattern matches its associated element in the extended context of the unit cell), or 0 (signifying that at least one element did not match). This value may be written into one or all of the propagate, transient, or control registers of the unit cell. If the value is written into the propagate register, it is made available for use by unit cells in its neighborhood for pattern match operations on the next instruction. A pattern match is performed during each instruction executed by the virtual processor.

Read

An address k is given to the external memory associated with each unit cell U(L, i, j). The bit of data from the extended memory location MB(L, i, j, k) is read from this memory and stored in the unit cell's transient register T(L, i, j)

Write

An address k is given to the external memory associated with each unit cell U(L, i, j). The contents of the transient register T(L, i, j) are written to the specified memory address in the unit cell's associated external memory location, MB(L, i, j, k).

An instruction is supplied to each of the virtual processors in synchrony by the controller 119, and virtual processors execute the given instruction simultaneously. Also, the controller 119 supplies the same address to each of the associated external memory stores, also in parallel.

The single exception to this rule is in the case of instructions where the instruction includes a control bit referred to as Cenable set to the value of 1. In this event, any virtual processor V(L, i, j) whose control register C(L, i, j) contains the value 1 is disabled for the duration of the instruction, and is not enabled to perform reads and writes. While the pattern match is being performed, the results cannot be written to any register. The contents of the disabled virtual processor's propagate register P(L, i, j) remain available to the virtual processors of other unit cells in the neighborhood of the disabled processor.

The instructions supplied by the controller to the pyramidal processing unit virtual processors and memory consist of 40 bits organized in the following eight fields.

Cenable (1 bit): The instruction specified by the remaining fields is only to be performed by virtual processor V(L, i, j) if the contents of the C register C(L, i, j) are 0 before execution of the instruction.

Pattern (25 bits): In order to minimize the number of signals used for pattern communication, the 15 ternary digits of the pattern are encoded into 25 bits using the following encoding scheme for each group of 3 ternary digits:

| VALUE | | | ENCODING | | | | |
|---|---|---|---|---|---|---|---|
| 3i | 3i+1 | 3i+2 | 5j | 5j+1 | 5j+2 | 5j+3 | 5j+4 |
| 0 | 0 | 0 | 0 | 0 | 0 | 0 | 0 |
| 0 | 0 | 1 | 0 | 0 | 0 | 0 | 1 |
| 0 | 0 | X | 0 | 0 | 0 | 1 | 0 |
| 0 | 1 | 0 | 0 | 0 | 0 | 1 | 1 |
| 0 | 1 | 1 | 0 | 0 | 1 | 0 | 0 |
| 0 | 1 | X | 0 | 0 | 1 | 0 | 1 |
| 0 | X | 0 | 0 | 0 | 1 | 1 | 0 |
| 0 | X | 1 | 0 | 0 | 1 | 1 | 1 |
| 0 | X | X | 0 | 1 | 0 | 0 | 0 |
| 1 | 0 | 0 | 0 | 1 | 0 | 0 | 1 |
| 1 | 0 | 1 | 0 | 1 | 0 | 1 | 0 |
| 1 | 0 | X | 0 | 1 | 0 | 1 | 1 |
| 1 | 1 | 0 | 0 | 1 | 1 | 0 | 0 |
| 1 | 1 | 1 | 0 | 1 | 1 | 0 | 1 |
| 1 | 1 | X | 0 | 1 | 1 | 1 | 0 |
| 1 | X | 0 | 0 | 1 | 1 | 1 | 1 |
| 1 | X | 1 | 1 | 0 | 0 | 0 | 0 |
| 1 | X | X | 1 | 0 | 0 | 0 | 1 |
| X | 0 | 0 | 1 | 0 | 0 | 1 | 0 |
| X | 0 | 1 | 1 | 0 | 0 | 1 | 1 |
| X | 0 | X | 1 | 0 | 1 | 0 | 0 |
| X | 1 | 0 | 1 | 0 | 1 | 0 | 1 |
| X | 1 | 1 | 1 | 0 | 1 | 1 | 0 |
| X | 1 | X | 1 | 0 | 1 | 1 | 1 |
| X | X | 0 | 1 | 1 | 0 | 0 | 0 |
| X | X | 1 | 1 | 1 | 0 | 0 | 1 |
| X | X | X | 1 | 1 | 0 | 1 | 0 |

The five groups of three ternary digits each carry the following pattern elements.

Group 1: NW, N, NE for even rows SW, S, SE for odd rows

Group 2: W, C, E

Group 3: SW, S, SE for even rows NW, N, NE for odd rows

Group 4: SNE, SNW, E

Group 5: SSE, SSW, T

One of ordinary skill in the art will readily understand that it is possible to encode the fifteen ternary digits of the pattern in a number of different ways, of which the demonstrated encoding is only an example. It is clear that other encodings may take either more or fewer signal lines to express a pattern.

POUT (1 bit): The result of the pattern match is to be written to the propagate register P(L, i, j) associated with the virtual processor V(L, i, j).

TOUT (1 bit): The result of the pattern match is to be written to the transient register T(L, i, j) associated with the virtual processor V(L, i, j).

COUT (1 bit): The result of the pattern match is to be written to the control register C(L, i, j) associated with the virtual processor V(L, i, j).

Address (9 bits): For each external memory M(L, i, j), the memory location MB(L, i, j, k) is specified by the nine bits k of the address field.

Read (1 bit): Read the contents of the specified external memory location MB(L, i, j, k) into the transient register. In the event that both this bit and the TOUT bit are set in a single instruction, the TOUT bit is ignored.

Write (1 bit): Write the transient register to the specified external memory location. In the event that both this bit and the Read bit are specified in a single instruction, the Read bit is ignored.

Integrated Circuit Implementation

As discussed above, each of the unit cells has associated therewith a processor and a number of registers. The development of NMOS technology and VLSI fabrication techniques has enabled the fabrication of multiple processors on a single integrated circuit chip. Such an implementation, however, remains subject to constraints on chip area and pin count. By associating an actual processor fabricated on an integrated circuit chip with a number of virtual processors in the pyramidal processing unit 103, it is possible to reduce significantly the requirements for both chip area and pin count for a given number of unit cells fabricated on a single integrated circuit chip. These actual processors may then serially simulate the operations of the virtual processors associated with them, allowing the pyramidal processing unit to simulate the actions of the fully parallel pyramidal processing unit defined above.

An integrated circuit chip in the pyramidal processing unit of the instant invention will be labeled IC(L, i, j) with a level L, a row i, and a column j uniquely identifying the position of the chip in the pyramidal processing unit. In the preferred embodiment, L is between 0 and 7 inclusive, and i and j may both take integer values from 0 to $2^{L-3}$, inclusive. In analogy with the pyramid data structure defined above, the chip IC(L, i, j) is the father of its son chips IC(L+1, 2*i, 2*j) through IC(L+1, 2*i+1, 2*j+1). Further, the chips IC(L, i−1, j−1) through IC(L, i+1, j+1) inclusive, as well as the father and sons of IC(L, i, j) are the neighbors of the chip IC(L, i, j).

There is associated with each integrated circuit processing chip IC(L, i, j) one or more solid state memory chips used for storage of the external memory associated with the virtual processors embodied on the processing chip. In the preferred embodiment, the processor chip IC(L, i, j), has associated therewith two memory chips ICM(L, i, j, 0) and ICM(L, i, j, 1). A word at a particular memory address on a memory chip will be identified as ICM(L, i, j, k, l), with k being 0 or 1 and l varying from 0 to 2047. A particular bit at an address ICM(L, i, j, k, l) will be ICM(L, i, j, k, l, m). The solid state memory module is discussed in more detail with reference to FIG. 5(b).

Association of Virtual and Actual Processors

There are eight actual processors, labelled A(L, i, j, k) with k varying from 0 to 7, fabricated on integrated circuit chip IC(L, i, j). In the preferred embodiment, each actual processor is associated with eight virtual processors, so that the actual processor A(L, i, j, k) is associated with the virtual processors V(L, 8*i, 8*j+k) through V(L, 8*i+7, 8*j+k). The shift registers PR(L, i, j, k), TR(L, i, j, k) and CR(L, i, j, k) are also to be associated with the virtual registers P(L, 8*i, 8*j+k) through P(L, 8*i+7, 8*j+k), T(L, 8*i, 8*j+k) through T(L, 8*i+7, 8*j+k), and C(L, 8*i, 8*j+k) through C(L, 8*i+7, 8*j+k). In the case of these shift registers, the propagate shift register storage cell PR(L, i, j, k, l) is to be identified with the P register labelled P(L, 8*i+l, 8*j+k), the transient shift register storage cell TR(L, i, j, k, l) is to be identified with the T register labelled T(L, 8*i+l, 8*j+k), and the C shift register storage cell CR(L, i, j, k, l) is to be identified with the C register labelled C(L, 8*i+l, 8*j+k).

The external memory M(L, i, j) associated with each virtual processor V(L, i, j) is located on one of the memory chips associated with the chip IC(L, i div 8, j div 8) embodying the virtual processor. In particular, the external memory associated with the virtual processor V(L, i, j) will be embodied on the memory chip ICM(L, i div 8, j div 8, i mod 2). In other words, the memory associated with a particular virtual processor is to be found in a contiguous block of addressable storage locations of the memory chip. Each of the eight virtual processors in a row on the processing chip will be associated with one bit of the memory chip when the memory is accessed, and alternate rows of virtual processors appear on the memory chips.

For levels 0 through 2, the number of unit cells on a level is not as great as the number of unit cells to be identified with a single IC chip. For these levels, some processing power of the IC chip will be unused. For level 3, the number of unit cells on a level is equal to the number of unit cells to be identified with a single IC chip. Similarly, at levels 4 through 7, more unit cells exist on the level than are present on a single integrated circuit chip. At these levels, more than one chip is provided per level, and means are provided for communication of context information between the chips at these levels.

One skilled in the art will understand that a pyramidal processing unit with either a greater or lesser number of levels may be constructed. In addition, it is possible to construct integrated circuit chips for the top levels of the pyramidal processing unit which consist of subparts of the integrated circuit chip design to be described below in order that no processing power be wasted.

Processing Order

Each actual processor A(L, i, j, k) performs operations, selected by the controller 119 on the contents of shift register cells PR(L, i, j, k, l), TR(L, i, j, k, l) and CR(L, i, j, k, l) to simulate the actions of the virtual processor V(L, 8*i+l, 8*j+k) on registers P(L, 8*i+l, 8*j+k), T(L, 8*i+l, 8*j+k), and C(L, 8*i+l, 8*j+k). Clearly the actual processor will require eight instructions to simulate one instruction of the eight virtual processors associated with it. Each of the instructions executed by the actual processor is referred to as a minor cycle, while a sequence of eight instructions simulating a single instruction of the eight virtual processors is collectively referred to as a major cycle.

The order in which an actual processor A(L, i, j, k) simulates the actions of the virtual processors associated with it varies according to the value of i. For i an even number, the actual processor first simulates the actions of virtual processor V(L, 8*i, 8*j+k), then the actions of virtual processor V(L, 8*i+1, 8*j+k), and so forth until the actions of virtual processor V(L, 8*i+7, 8*j+k) are simulated. For i an odd number, the actual processor first simulates the actions of the virtual processor V(L, 8*i+7, 8*j+k), then the actions of the virtual processor V(L, 8*i+6, 8*j+k), and so forth until the actions of the virtual processor V(L, 8*i, 8*j+k) are simulated. As will be described later, this is possible with only minimal difference between the even and odd chip rows. The chips can be fabricated as though each chip did in fact process in the order followed by even chip rows, with external connections between the chips responsible for maintaining the correct processing order and communications paths.

Figure 3:
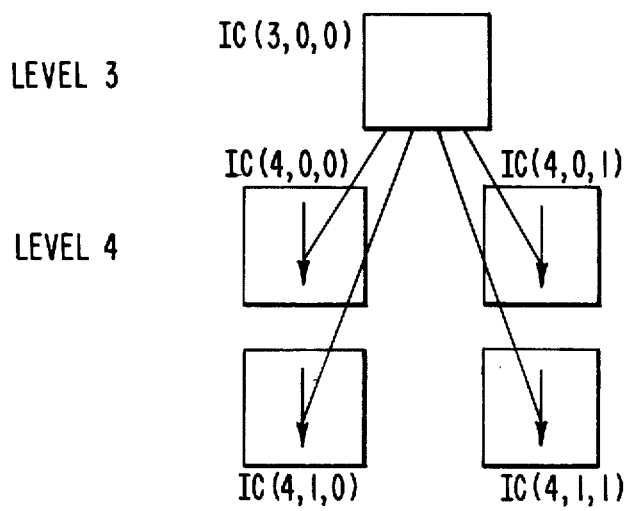
FIG. 3 is a schematic illustration of the processing order among semiconductor integrated circuit chips utilized in implementing the pyramidal processing system of FIG. 2.

This processing order may be best understood with reference to FIG. 3 wherein the processing order for the integrated circuit chips IC(4, 0, 0), IC(4, 0, 1), IC(4, 1, 0), and IC(4, 1, 1) is illustrated. As shown, the processors on integrated chips IC(4,0,0) and IC(4, 0, 1) process in accordance with the above-discussed rule for i being even. The processors on integrated circuit chips IC(4, 1, 0) and IC(4, 1, 1) process in accordance with the above-discussed rule of i being odd.

Communications Between Chips

One skilled in the art will readily understand that certain unit cells in the neighborhood of a unit cell in the pyramid will be located on integrated circuit chips other than that of the given unit cell. These are as follows:

1. The father of a unit cell U(L, i, j) fabricated on IC(L, 1, i div 8, j div 8) will be found on the integrated circuit chip IC(L−1, i div 16, j div 16). If L=0, there is no father.
2. The sons of a unit cell U(L, i, j) fabricated on IC(L, i div 8, j div 8) will be found on one of the four integrated circuit chips IC(L,+1, i div 4, j div 4) through IC(L+1, i div 4+1, j div 4+1), inclusive. for L=7, there are no sons.
3. In the case of a unit cell U(L, i, j) fabricated on IC(L, i div 8, j div 8) such that the unit cell is associated with the actual processor A(L, i div 8, j div 8, 0) (that is, the cell is located on the west edge of the chip), the west neighbor of the unit cell is fabricated on integrated circuit chip IC(L, i div 8, j div 8−1). If j=0 (the unit cell is located on the west edge of the pyramidal data structure), there is no west neighbor.
4. In the case of a unit cell U(L, i, j) fabricated on IC(L, i div 8, j div 8) such that the unit cell is associated with the actual processor A(L, i div 8, j div 8, 7) (that is, the cell is located on the east edge of the chip), the east neighbor of the unit cell is fabricated on integrated circuit chip IC(L, i div 8, j div 8+1). If j=$2^{L-3}$ (the unit cell is located on the east edge of the pyramidal data structure), there is no east neighbor.
5. In the case of a unit cell U(L, i, j) fabricated on IC(L, i, div 8, j div 8) such that the unit cell is associated with storage cell 0 of the propagate, transient, and control registers (the cell is located on the north edge of the chip), the north neighbor of the cell will be found on IC(L, i, div 8−1, j div 8). If i=0 (the unit cell is located on the north edge of the pyramidal date structure), there is no north neighbor cell.
6. In the case of a unit cell U(L, i, j) fabricated on IC(L, i div 8, j div 8) such that the unit cell is associated with storage cell 7 of the propagate, transient, and control registers (the cell is located on the south edge of the chip), the south neighbor is the cell found on IC(L, i div 8+1, j div 8). If i=$2^L$ (the unit cell is located on the south edge of the pyramid), there is no south neighbor cell.

Means are provided for communicating with the integrated circuit chips to the East, West, North, and South in the same processing level as well as with the integrated circuit chips in the levels of immediately higher and immediately lower resolution, in accordance with the pyramidal data structure in FIG. 1.

Neighborhood Communication

Communications means are provided between neighboring chips as follows:

Communications between an integrated circuit chip IC(L, i, j) and its North and South neighbors IC(L, i−1, j) and IC(L, i+1, j) are provided by the North and South communications subsystems NC(L, i, j) and SC(L, i, j). As will become more clear as the preferred embodiments of the chip subsystems are discussed, NC(L, i, j) will only communicate with the North neighbor if i is even. If i is odd, NC(L, i, j) will actually communicate with the neighbor to the South. Similarly, the South communications subsystem will only actually communicate with the chip to the South if i is even; if i is odd, then the South communications subsystem will actually be communicating with the chip immediately to the North. From this, it will be understood that connections exist between North communications subsystems, and likewise between South communications subsystems. North and South communications subsystems are not used to communicate with each other.

Communications between an integrated circuit chip IC(L, i, j) and its remaining neighbors are provided by having each chip make available as outputs all data produced for writing to the propagate register. This information is then captured by the appropriate chip subsystem on the neighboring chips.

A chip IC(L, i, j) is able to obtain West context data from its West neighbor IC(L, i, j−1) through the use of its West communications subsystem WC(L, i, j). Data from its East neighbor IC(L, i, j−1) may similarly be obtained by the functionally equivalent East communications subsystem EC(L, i, j).

Data from the diagonally adjacent chips IC(L, i−1, j−1), IC(L, i−1, j+1), IC(L, i+1, j−1), IC(L, i+1, j+1) is obtained by the Northeast, Southeast, Northwest, and Southwest communications subsystems NE(L, i, j), SE(L, i, j), NW(L, i, j), and SW(L, i, j). As shown in FIG. 3, with the North and South communications subsystems, the Northeast and Northwest communications subsystems will actually obtain information from the Southeast and the Southwest neighboring chips, respectively, on odd row chips. Similarly, the Southeast and Southwest communications subsystems will actually obtain data from the Northeast and the Northwest neighboring chips, respectively, on odd row chips.

Data from a chip's father IC(L−1, i div 2, J div 2) is obtained by the father communications subsystem FC(L, i, j), and data from the four sons IC(L+1, 2*i, 2*j), IC(L+1, 2*i, 2*j+1), IC(L+1, 2*i+1, 2*j), and IC(L+1, 2*i+1, 2*j+1) is obtained by the son communication subsystems SC0(L, i, j), SC1(L, i, j), SC2(L, i, j), and SC3(L, i, j). Once again, North and South are inverted for chips on odd rows.

Figure 4B:
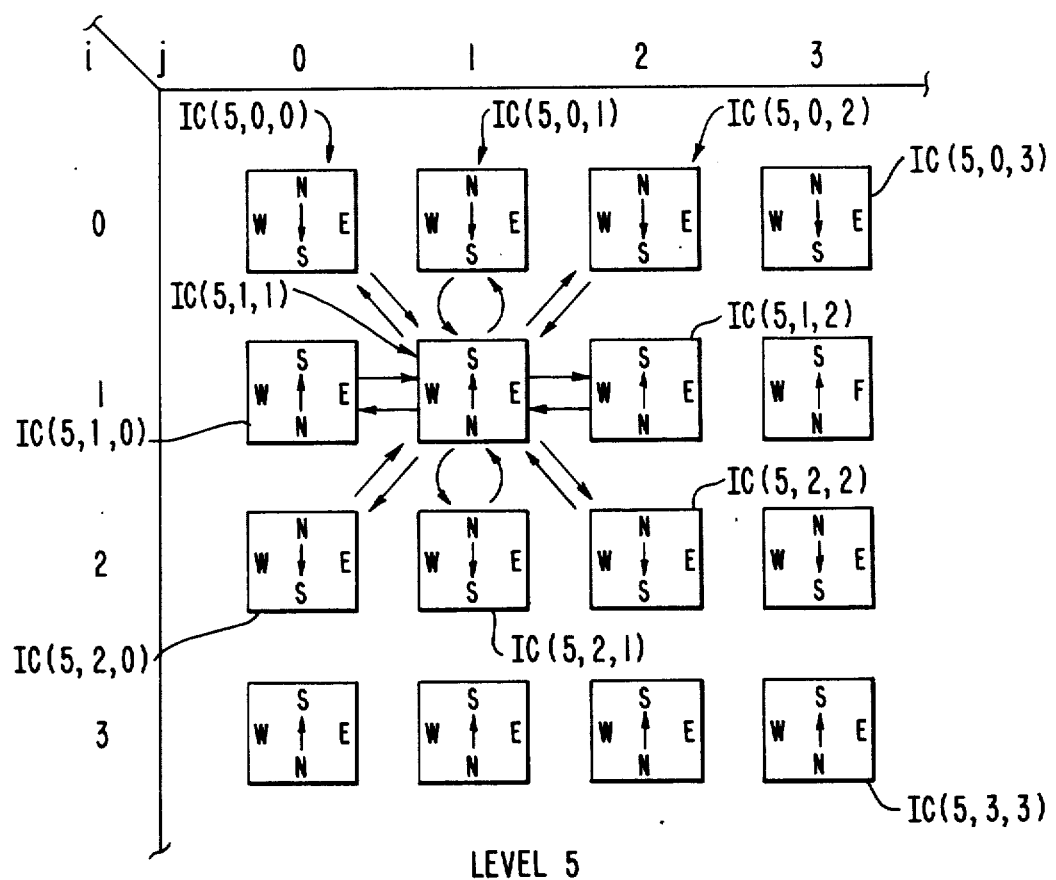
FIG. 4(b) is a schematic illustration of data transfer paths between integrated chips of Level 5 of the processing system of FIG. 2.
Figure 4A:
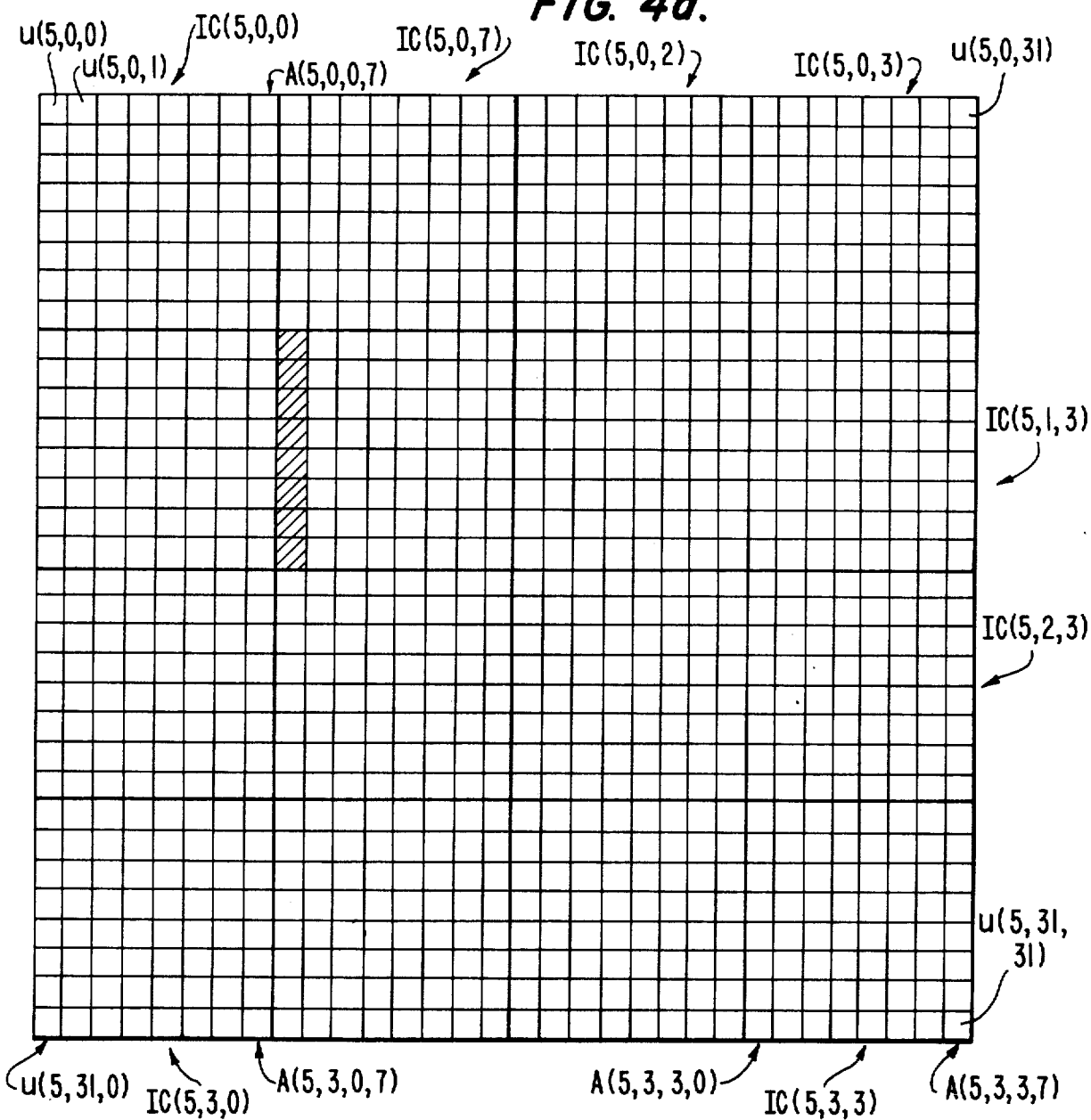
FIG. 4(a) is a schematic illustration of the unit cells, data elements, actual processors, and integrated circuit chips constituting Level 5 of the processing system of FIG. 2.

FIGS. 4(a) and 4(b) illustrate the concept of a local neighborhood in greater detail. With reference to FIG. 4(a) a graphic illustration of the unit cells comprising Level 5 of the pyramid data structure is illustrated. In Level 5 there are $4^5$ unit cells or a total of 1,024 unit cells. Each of the small squares in FIG. 4(a) corresponds to an individual unit cell and the small squares are appropriately referenced by numerals U(5, 0, 0) . . . , U(5, 0, 31) . . . , U(5, 31, 0) . . . , U(5, 31, 31).

As stated above, each of the unit cells corresponds to a virtual processor. Accordingly, the small squares in FIG. 4(a) could also be referenced as virtual processors V(5, 0, 0) . . . , V(5, 0, 31) . . . , V(5, 31, 0) . . . , V(5, 31, 31). As further stated above, an actual processor corresponds to eight virtual processors. Moreover, there are eight actual processors fabricated on each integrated circuit chip. Accordingly, FIG. 4(a) includes 16 larger squares defined by heavy black lines corresponding to 16 integrated circuit chips IC(5, 0, 0) . . . , IC(5, 0, 3), IC(5, 3, 0) . . . , IC(5, 3, 3).

The integrated circuit chip IC(5, 1, 1) includes eight actual processors A(5, 1, 1, 0), . . . , A(5, 1, 1, 7). Since each of the actual processors is further associated with eight virtual processors (unit cells) then there are 64 virtual processors (unit cells) associated with each integrated circuit chip.

The cross hatched column representing eight unit cells U(5, 8, 8)–U(5, 15, 8) are associated with an actual processor A(5, 1, 1, 0) on the integrated circuit chip IC(5, 1, 1). The relationship of this actual processor with regard to the local neighborhood actual processors will be discussed with reference to FIG. 4(b).

Level 5 of the pyramid processing structure is illustrated in FIG. 4(b) at the integrated circuit chip level. Accordingly, Level 5 is shown to include 16 integrated circuit chips arranged in a 4×4 array and referenced as IC(5, 0, 0), . . . , IC(5, 3, 3). The local neighborhood for the integrated circuit chip IC(5, 1, 1) in Level 5 comprises vertically, horizontally, and diagonally adjacent integrated circuit chips. As stated above, as a convention for the description of the instant invention, the neighboring chips are defined upon a coordinate system. Accordingly, the northern neighbor of the integrated circuit chip IC(5, 1, 1) is an integrated circuit chip IC(5, 0, 1). The southern, eastern, and western neighbors of the integrated circuit chip IC(5, 1, 1) comprise the integrated circuit chips IC(5, 2, 1), IC(5, 1, 2), and IC(5, 1, 0), respectively. The southeast, northeast, northwest, and southwest neighbors of the integrated circuit chip IC(5, 1, 1) comprise the integrated circuit chips IC(5, 2, 2), IC(5, 0, 2), IC(5, 0, 0), and IC(5, 2, 0), respectively. As shown in FIG. 4(b), bidirectional data transfer paths are provided between the integrated circuit chip IC(5, 1, 1) and its north, south, east, west, northeast, southeast, southwest, and northwest neighboring integrated circuit chips.

The father of integrated circuit chip IC(5, 1, 1) is the integrated circuit IC(4, 0, 0) located at Level 4 of the pyramid. The integrated circuit chip IC(5, 1, 1) has four sons, the integrated circuitry chips IC(6, 2, 2), IC(6, 2, 3), IC(6, 3, 2), and IC(6, 3, 3) located at level 6 of the pyramidal processing system. As with the local neighborhood in Level 5, bidirectional communications paths exist between IC(5, 1, 1) and its father and sons by means of the father and sons communications subsystems.

Figure 5A:
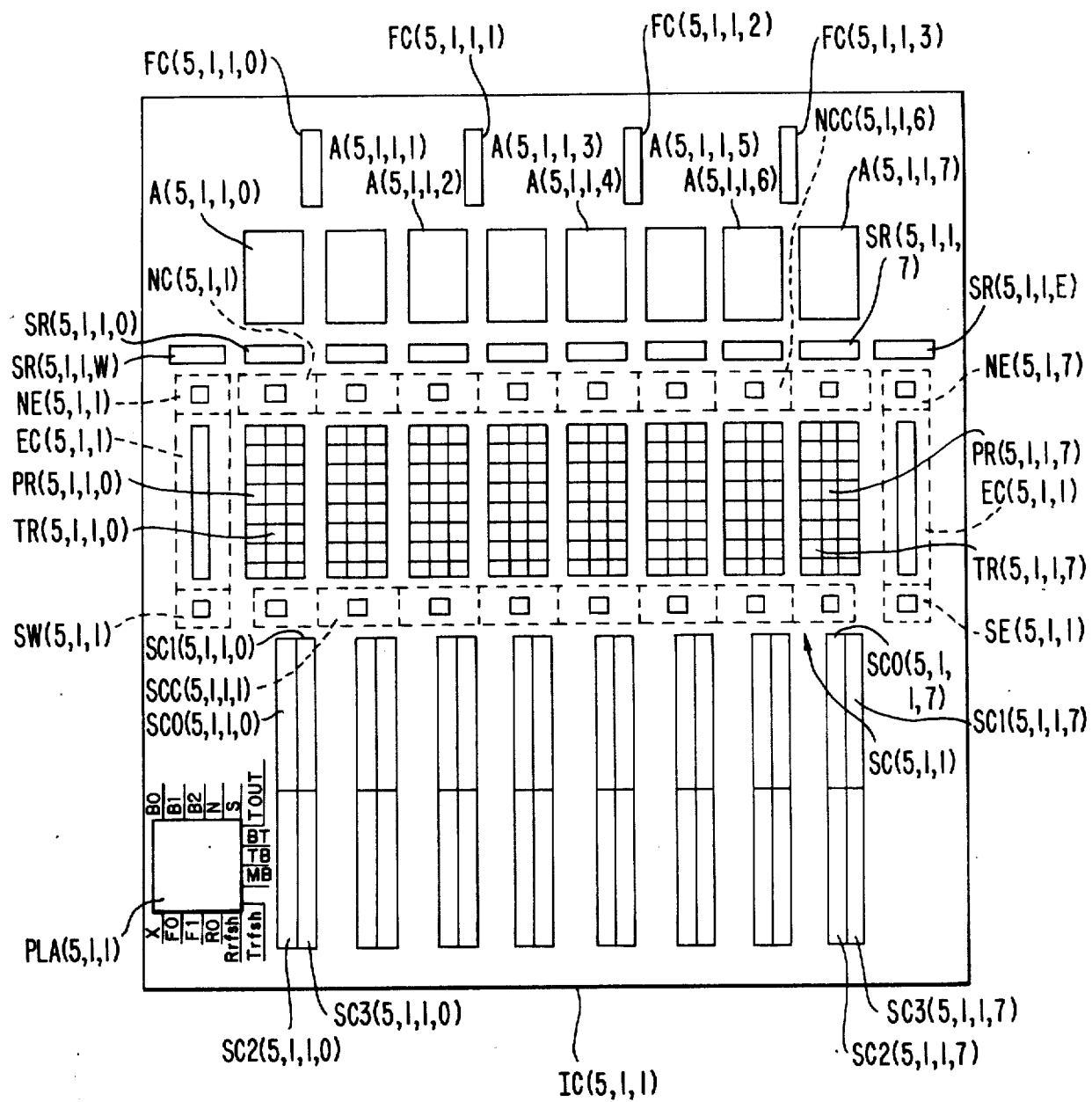
FIG. 5(a) is a plan view of a semiconductor integrated circuit chip utilized in implementing the pyramidal processing system of FIG. 2.

FIG. 5(a) is a plan view of an integrated circuit chip embodying a row of actual processors associated with a plurality of rows and columns of unit cells in the pyramidal data structure shown in FIG. 1. As discussed above, in the preferred embodiment there are eight actual processors formed on each integrated circuit chip. Each of the actual processors has associated therewith three shift registers each of length eight bits. The actual processors on a chip IC(L, i, j) are labelled A(L, i, j, k), with k taking values from 0 to 7, inclusive. The three shift registers associated with the actual processor A(L, i, j, k) are labelled PR(L, i, j, k) (propagate register), TR(L, i, j, k) (transient register), and CR(L, i, j, k) (control register). The individual storage cells or stages in the three shift registers are labelled PR(L, i, j, k, l), TR(L, i, j, k, l), and CR(L, i, j, k, l), with l taking values of 0 to 7, inclusive. There are, therefore, 8 each of the PR, TR, and CR registers, each containing 8 storage cells or stages, formed on each integrated circuit chip. Accordingly, memory means for the storage of values associated with 64 different unit cells is provided on a single integrated circuit chip.

One with skill in the art would understand that given specific performance, cost, environment, or other considerations, a larger number or a smaller number of processors may be fabricated on each integrated circuit chip.

Referring again to FIG. 5(a), the Level 5 processors A(5, 1, 1, 0)–A(5, 1, 1, 7) are arranged in parallel on the surface on the integrated circuit chip IC(5, 1, 1). Means are provided for transferring the values of the individual data elements (values associated with unit cells) from a level of lower resolution, e.g., Level 4, to the plurality of fifth level processors A(5, 1, 1, 0)–A(5, 1, 1, 7). As embodied herein, the transferring means comprises father communication circuits FC(5, 1, 1, 0)–FC(5, 1, 1, 3).

The father communication circuit FC(5, 1, 1, 0) provides a data transfer path between an actual processor, A(4, 0, 0, 4) (not shown) of Level 4 and the actual processors A(5, 0, 1, 0), A(5, 0, 1, 1) A(5, 1, 1, 0), and A(5, 1, 1, 1) of Level 5. Of these four Level 5 son processors, actual processors A(5, 0, 1, 0) and A(5, 0, 1, 1) are formed on the integrated circuit chip IC(5, 0, 1) whereas actual processors A(5, 1, 1, 0) and A(5, 1, 1, 1) are formed on the integrated circuit chip IC(5, 1, 1).

A father communication circuit FC(5, 1, 1, 1) provides a data transfer path between the actual processor A(4, 0, 0, 5) of Level 4 and the actual processors A(5, 1, 1, 2) and A(5, 1, 1, 3) of Level 5. As father communication circuit FC(5, 1, 1, 2) provides a data transfer path between an actual processor A(4, 0, 0, 6) of Level 4 and the actual processors A(5, 1, 1, 4) and A(5, 1, 1, 5) of Level 5. Finally, a father communication circuit FC(5, 1, 1, 3) comprises a data transfer path between an actual processor A(4, 0, 0, 7) of Level 4 and the Level 5 actual processors A(5, 1, 1, 6) and A(5, 1, 1, 7).

Each of the actual processors A(5, 1, 1, 0)–A(5, 1, 1, 7) has associated therewith memory means for storing a data matrix comprising an array of Level 5 data elements (values associated with unit cells). As embodied herein, the memory means comprises the above-described sets of registers storing the context associated with each of the actual processors A(5, 1, 1, 0) through A(5, 1, 1, 7). Accordingly, a transient register TR(5, 1, 1, 0), a propagate register PR(5, 1, 1, 0), and a control register CR(5, 1, 1, 0) are associated with the actual processor A(5, 1, 1, 0). Similarly, a transient register TR(5, 1, 1, 7), a propagate PR(5, 1, 1, 7), and a control register CR(5, 1, 1, 7) are associated with the actual processor A(5, 1, 1, 7).

The propagate register PR(5, 1, 1, 0) comprises an eight bit register for storing each of the values of eight unit cells. The transient register TR(5, 1, 1, 0) is also an 8 bit register which serves as source and destination storage for data transferred between the actual processor A(5, 1, 1, 0) and the memory module ICM(5, 1, 1, 0) (FIG. 5(b)). Finally, the control register CR(5, 1, 1, 0) is an eight bit shift register for storing the control information received from the controller 119. As will be explained below, the contents of the control register CR(5, 1, 1, 0) in part determine the performance of functions by the Level 5 actual processor A(5, 1, 1, 0).

As embodied herein, each of the propagate register, the transient register, and the control register associated with each actual processor includes 8 stages or storage locations corresponding to the eight values or data elements comprising eight unit cells (virtual processors) associated with an actual processor. Similarly numbered stages or storage locations of the propagate, transient, and conditional registers store related data and the relationship is maintained as the data is shifted through and transferred from these registers.

Each of the processors has associated therewith a shift register for transferring the contents of its associated propagate register to another of the processors on the same integrated circuit chip. Accordingly, a shift register SR(5, 1, 1, 0) is coupled to the propagate register PR(5, 1, 1, 0) such that the values or data elements stored in the propagate register PR(5, 1, 1, 0) can be accessed by a neighboring actual processor A(5, 1, 1, 1).

As stated above, the actual processor A(5, 1, 1, 0) has a north neighbor, the actual processor A(5, 2, 1, 0), and a south neighbor, the actual processor A(5, 0, 1, 0). It is a function of a north communication circuit NC(5, 1, 1,) and a south communication circuit SC(5, 1, 1) to provide bidirectional transfer paths between the actual processors A(5, 1, 1, 0)–A(5, 1, 1, 7) on integrated circuit chip IC(5, 1, 1) and the southern local neighborhood processors A(5, 0, 1, 0)–A(5, 0, 1, 7) on the integrated circuit chip IC(5, 0, 1) and the northern neighborhood local processors A(5, 2, 1, 0)–A(5, 2, 1, 7) on the integrated circuit chip IC(5, 2, 1), respectively. Thus, it is a function of the north communication circuit and the south communication circuit to transfer, when necessary, values stoed in the propagate registers of neighboring integrated circuit chips to selected processors on the integrated circuit chip IC(5, 1, 1).

Similarly, the transfers of propagate register values from the west and east local neighbors of the actual processors A(5, 1, 1, 0) and A(5, 1, 1, 7) are performed by the west communication circuit WC(5, 1, 1) and the east communication circuit EC(5, 1, 1).

The method for accomplishing the bidirectional transfer of propagation register values between diagonally located neighbors, i.e., northeast, northwest, southeast, and southwest, depends upon whether such diagonal neighbors are located on the same or different integrated circuit chip. For example, the northeast, northwest, southeaset, and southwest neighbors of propagation register cells or stages PR(5, 1, 1, l)–PR(5, 1, 1, 6, 1) (1≦l≦6) are all present on the integrated circuit chip IC(5, 1, 1). Similarly, the southeast neighbor of each of the propagation register cells or stages PR(5, 1, 1, 0, 1)–PR(5, 1, 1, 0, 7) and the southwest neighbors of each of the propagation register cells or stages PR(5, 1, 1, 7, 1)–PR(5, 1, 1, 7, 7) are also located on the integrated circuit chip IC(5, 1, 1). The northeast neighbors of each of the propagation register cells or stages PR(5, 1, 0, 0)–PR(5, 1, 1, 0, 6) and the northwest neighbors of each of the propagation register cells or stages PR(5, 1, 1, 7, 0)–PR(5, 1, 1, 7, 6) are also located on the integrated circuit chip IC(5, 1, 1). All such propagation register cells or stages on the integrated circuit chip IC(5, 1, 1) are transferrable through the shift register SR(5, 1, 1, 0)–SR(5, 1, 1, 7).

On the other hand, the southeast and southwest neighbors of the propagation register cells PR(5, 1, 1, 0, 0)–PR(5, 1, 1, 7, 0), the northeast and northwest neighbors of the propagation register cells PR(5, 1, 1, 0, 7)–PR(5, 1, 1, 7, 7), the northeast and southeast neighbors of the propagation register cells PR(5, 1, 1, 7, 1)–PR(5, 1, 1, 7, 6), and the northwest and southwest neighbors of the propagation register cells PR(5, 1, 1, 0, 1)–PR(5, 1, 1, 0, 6) are not located on integrated circuit chip IC(5, 1, 1) and must be transferred to the appropriate actual processors A(5, 1, 1, 0)–A(5, 1, 1, 7) through northeast, northwest, southeast, and southwest communication registers NE(5, 1, 1), NW(5, 1, 1), SE(5, 1, 1) and SW(5, 1, 1), respectively. See FIGS. 8(a) and 8(b).

Referring again to FIG. 5(a), the actual processor A(5, 1, 1, 1) is the east neighbor of the actual processor A(5, 1, 1, 0) and the transfer of propagate register values from the propagation register PR(5, 1, 1, 1) to the actual processor A(5, 1, 1, 0) is performed by the shift registers SR(5, 1, 1, 1) and the shift register SR(5, 1, 1, 0). The south, southeast, northeast, and north neighbors for storage cells PR(5, 1, 1, 1) through PR(5, 1, 1, 6) are also stored in the storage cells of the propagate register PR(5, 1, 1, 1). The southern neighbor of the storage cell PR(5, 1, 1, 0, 0) is the storage cell PR(5, 0, 1, 0, 7) associated with the actual processor A(5, 0, 1, 0). The southeastern and southwestern neighbors for the storage cell PR(5, 1, 1, 0, 0) comprise the storage cells PR(5, 0, 1, 1, 7) and PR(5, 0, 0, 7, 7), respectively, formed on the integrated circuit chips IC(5, 0, 1) and IC(5, 0, 0), respectively.

The northern neighbor for the storage unit cell PR(5, 1, 1, 0, 7) is the storage unit cell PR(5, 2, 1, 0, 0) associated with the actual processor A(5, 2, 1, 0) formed on the integrated circuit chip IC(5, 2, 1). The northeastern and northwestern neighbors of the storage cell PR(5, 1, 1, 0, 7) comprise the storage cell PR(5, 2, 1, 1, 0) associated with the actual processor A(5, 2, 1, 1) formed on the integrated circuit chip IC(5, 2, 1) and the storage cell PR(5, 2, 0, 7, 0) associated with the actual processor A(5, 2, 0, 7) formed on the integrated circuit chip IC(5, 2, 0), respectively.

In addition, as stated above, each of the actual processors A(5, 1, 1, 0)–A(5, 1, 1, 7) communicates with its associated son processors in the next processor level of greater data resolution. As shown in FIG. 5(a), the actual processor A(5, 1, 1, 0) has associated therewith four son communication circuits SC0(5, 1, 1, 0)–SC3(5, 1, 1, 0) for communicating with appropriate actual processors in Level 6 of the pyramidal data structure. The Level 6 actual processors in communication with the actual processor A(5, 1, 1, 0) through the son communication circuits comprise the actual processors A(6, 2, 2, 0), A(6, 2, 2, 1), A(6, 3, 2, 0) and A(6, 3, 2, 1).

Each of the integrated circuit chips IC(L, i, j) includes one or more programmed logic arrays PLA(L, i, j) for generating on-chip control signals. For example, the integrated circuit chip IC(5, 1, 1) (FIG. 5(a)) includes a programmed logic array module PLA(5, 1, 1) which generates gating and other signals in a manner discussed in detail below.

Figure 5B:
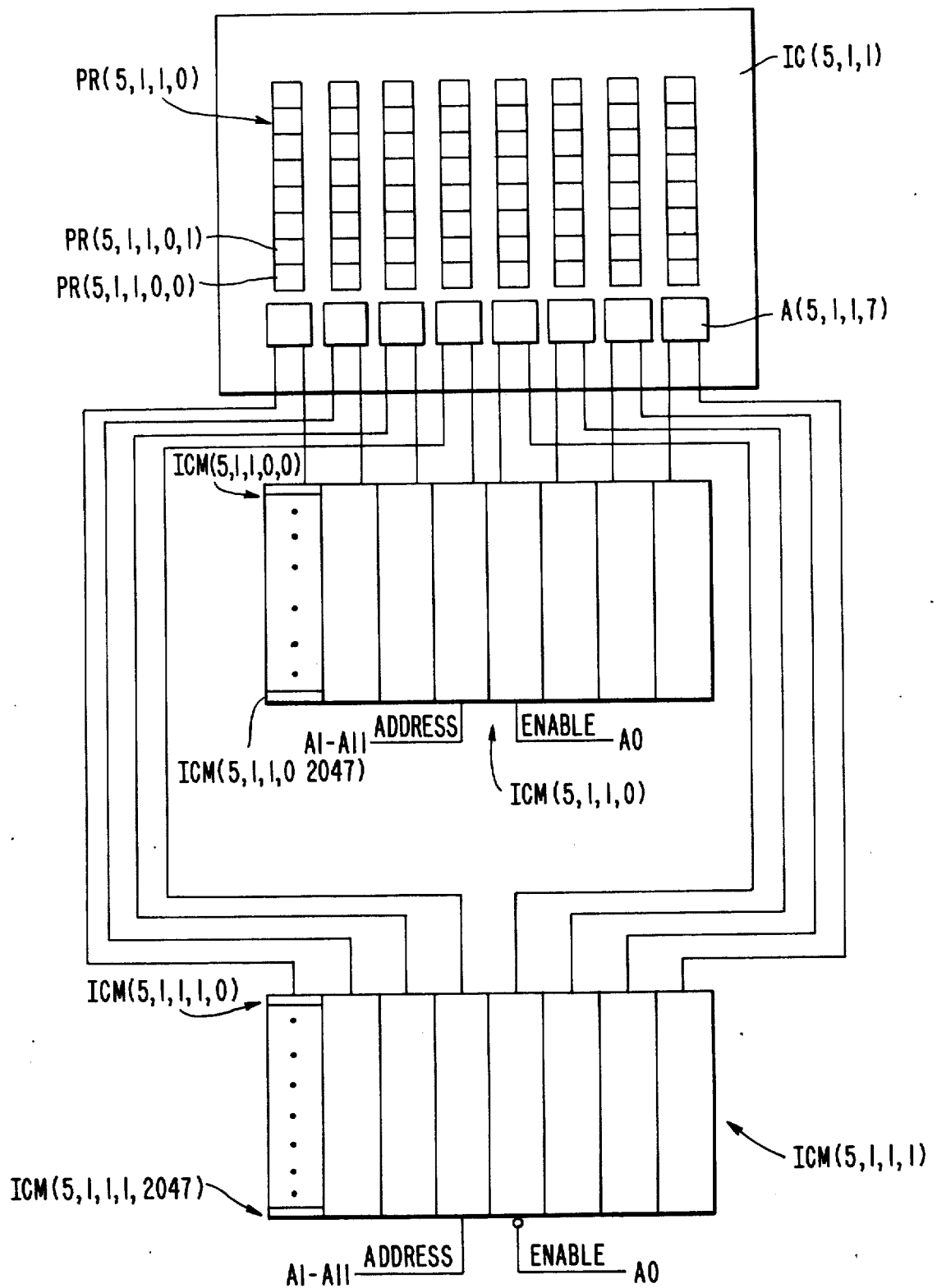
FIG. 5(b) is a schematic illustration of the interconnections between the actual processors on an integrated circuit chip and associated memory chips.

FIG. 5(b) is a schematic illustration of the external memory chips ICM(5, 1, 1,0) and ICM(5,1,1,1) associated with the integrated circuit chip IC(5, 1, 1). The actual processor A(5, 1, 1, 0) is coupled for bidirectional communication with the integrated circuit chip memory module ICM(5, 1, 1, 0). As stated above each cell in the propagate register PR(5, 1, 1, 0) associated with the actual processor A(5, 1, 1, 0) is further associated with 512 bits of external memory, i.e., memory locations ICM(5, 1, 1, 0, 0)–ICM(5, 1, 1, 0, 511) are associated with propagate register cell PR(5, 1, 1, 0, 0); memory locations ICM(5, 1, 1, 0, 512)–ICM(5, 1, 1, 0, 1023) are associated with propagate register cell PR(5, 1, 1, 0, 1), etc.

As embodied herein, the external memory chips ICM(5, 1, 1, 0) and ICM(5,1,1,1) each comprise a random access memory including 2,048 words of eight bits each. One of ordinary skill in the art, however, would realize that different capacity memory chips could be used and that a number of memory locations other than 512 could be associated with each propagate register cell. Moreover, each integrated circuit chip IC(L, i, j) could be associated with more than one external memory chip ICM(L, i, j).

Embodiments of Chip Subsystems

The chip subsystems to be described below are each controlled by two sources. Instructions are provided to the processors by the controller 119, described elsewhere. Sequencing on the integrated circuit chip IC(L, i, j) is provided by a local chip control PLA(L, i, j). The eight processors on the chip are each controlled directly by local processor controllers PLA(L, i, j, k). The programming of these programmed logic arrays will be described later.

Figure 6:
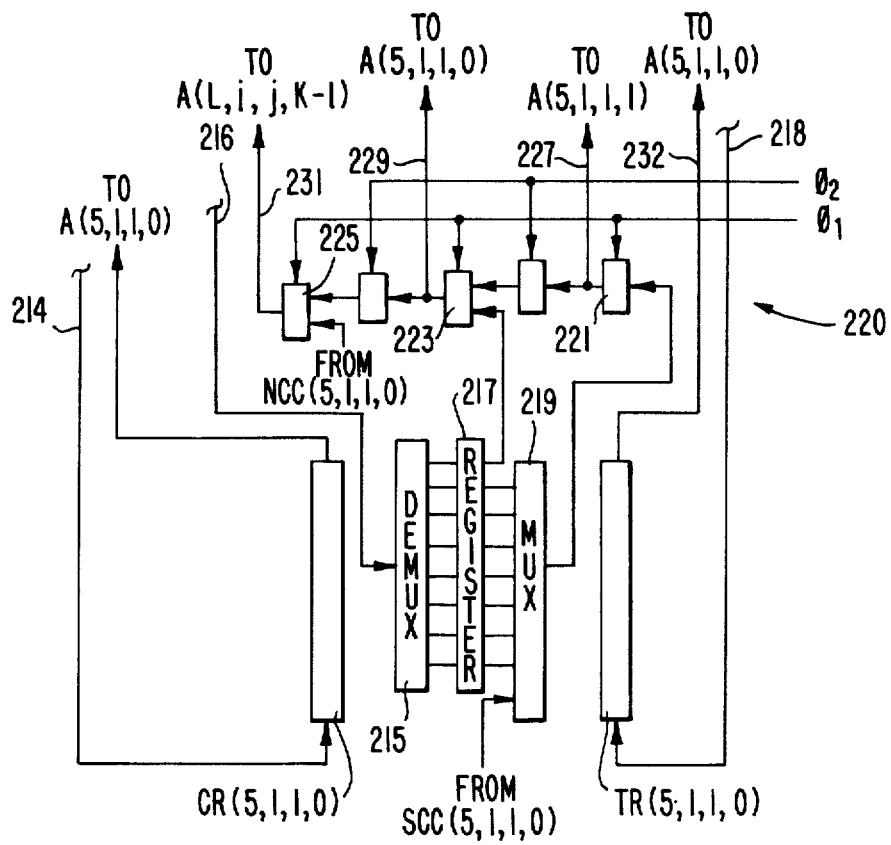
FIG. 6 is an illustration of an embodiment of the transient, propagate, and control registers associated with each processor included in the integrated semiconductor circuit chip of FIG. 3.

FIG. 6 illustrates an embodiment of the control register CR(5, 1, 1, 0), the propagate register PR(5, 1, 1, 0), and the transient register TR(5, 1, 1, 0) associated with the Level 5 actual processor A(5, 1, 1, 0).

The propagate register PR(5, 1, 1, 0) consists of a demultiplexor 215, an eight bit storage register 217, a multiplexor 219, and a three bit shift register 221.

The input to the demultiplexor 215 is a signal line 216 from the actual processor A(5, 1, 1, 0) to supply data element values in series to be stored in the storage register 217 for refresh and loading purposes. The demultiplexer 215 allows data from the input signal line 216 to be stored in any of the eight storage cells PR(5, 1, 1, 0, 0) through PR(5, 1, 1, 0, 7) of the data storage register 217, as determined by the local chip controller PLA(5, 1, 1) control signals B2, B1, and B0. The multiplexor 219 selectively accesses and transfers the contents of the storage register 217 of the first input cell 221 of a three bit shift register 220. The multiplexor 219 is capable of selecting any of the last seven storage cells PR(5, 1, 1, 0, 1)–PR(5, 1, 1, 0, 7), or an output of the stage SCC(5, 1, 1, 0) of the south communication circuit SC(5, 1, 1) (see FIG. 7(a)) for input to the first input cell 221 of the three bit shift register 220. This is also performed under the control of PLA(5, 1, 1) output signals B2, B1, B0.

The first storage cell PR(5, 1, 1, 0, 0) of the register 217 is directly coupled to the second input cell 223 of the shift register 220 to facilitate the loading of the data elements. This loading is performed under the control of the PLA(5, 1, 1,) output signal N.

A third input cell in the shift register 220 is the output of stage NCC(5, 1, 1, 0) of the north communication circuit NC(5, 1, 1). (See FIG. 7(b).) This operation is controlled by the output signal N of the PLA(5, 1, 1).

Each of the three output signal lines 227, 229, 231 connected between the input cells or stages 221, 223, 225 of shift register 220 is coupled as an input to each of the actual processors A(L, i, j, k−1), A(L, i, j, k), and A(L, i, j, k+1). In the case of the propagate register PR(5, 1, 1, 0), there is no actual processor A(L, i, j, k−1), and so the data elements stored in shift register stage 221, 223 and 225 cannot be supplied to such an actual processor. Thus, the signal lines 227 229 and 231 are coupled to the actual processors A(5, 1, 1, 0) and A(5, 1, 1, 1).

Similarly, in the case of a propagate register PR(L, i, j, 7), such as the actual processor A(5, 1, 1, 7), there is no actual processor A(L, i, j, k+1), and so the data is not supplied to such a processor. For the remaining six actual processors, A(5, 1, 1, 1)–A(5, 1, 1, 6) on the integrated circuit chip IC(5, 1, 1), the data is supplied to the actual processors A(L, i, j, k−1), A(L, i, j, k), and A(L, i, j, k+1) by the signal lines 227, 229 and 231.

The control register CR(5, 1, 1, 0) and the transient register TR(5, 1, 1, 0) are both fabricated as eight bit shift registers, with input terminals from the actual processor A(5, 1, 1, 0). An input terminal 214 enables the actual processor A(5, 1, 1, 0) to load or refresh the contents of the control register CR(5, 1, 1, 0). The output of the control register CR(5, 1, 1, 0) is transmitted to the actual processor A(5, 1, 1, 0) and to the local processor controller PLA(5, 1, 1, 0), for use in selectively disabling the actual processor A(5, 1, 1, 0) as described above.

The output of the transient register TR(5, 1, 1, 0) is supplied over a signal line 232 to the actual processor A(5, 1, 1, 0) and to a chip output pin 234 to the external memory chip ICM(5, 1, 1). (See FIG. 11) The input of the transient register TR(5, 1, 1, 0) may be selectively supplied by either the actual processor A(5, 1, 1, 0) or the auxiliary memory ICM(5, 1, 1), enabling either the actual processor A(5, 1, 1, 0) to load or refresh the transient register TR(5, 1, 1, 0), or the auxiliary memory ICM(5, 1, 1) to load the transient register TR(5, 1, 1, 0).

Figure 7A:
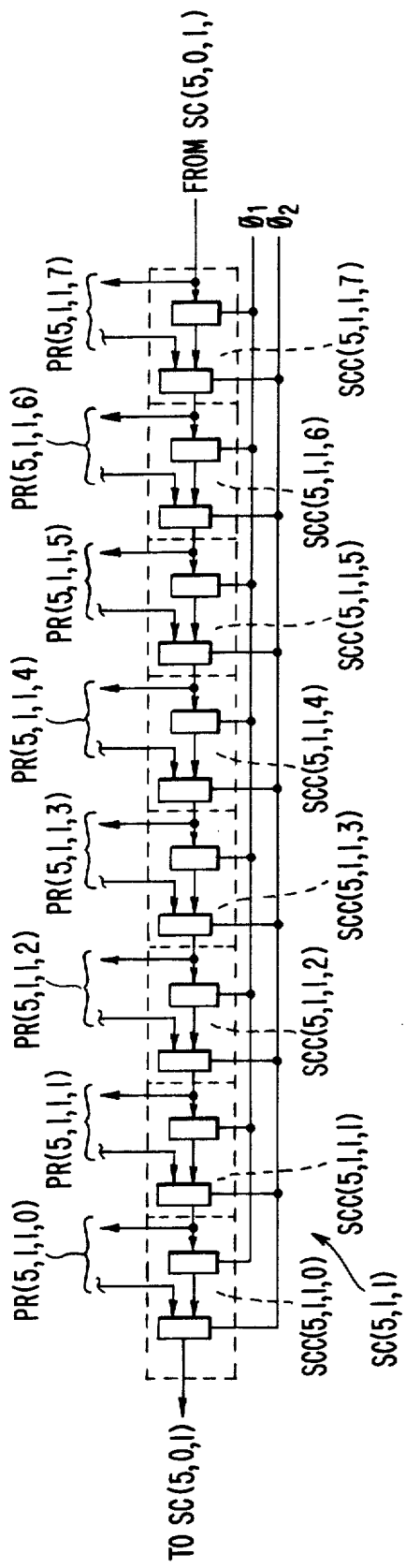
FIG. 7(a) is an illustration of the south communication circuit used at Level 5 of the pyramidal processing system of FIG. 2.

FIG. 7(a) illustrates the south communication circuit SC(5, 1, 1) on the integrated circuit chip IC(5, 1, 0). The south communication circuit SC(5, 1, 1) provides the eight actual processors A(5, 1, 1, 0)–A(5, 1, 1, 7) located on the integrated circuit chip IC(5, 1, 1) with south context information for use in processing the neighborhood of the south-most propagate register cells, PR(5, 1, 1, 0, 7)–PR(5, 1, 1, 7, 7) of the propagate registers PR(5, 1, 1, 0)–PR(5, 1, 1, 7) associated with the actual processors A(5, 1, 1, 0)–A(5, 1, 1, 7), respectively. The south communication register SC(5, 1, 1) also transfers the contents of the propagate register cells PR(5, 1, 1, 0, 7)–PR(5, 1, 1, 7, 7) to the southern neighbor processors, actual processor A(5, 0, 1, 0)–A(5, 0, 1, 7) on the integrated circuit chip IC(5, 0, 1).

In more general terms, the south communication circuit SC(L, i, j) transfers the contents of the propagate register cells PR(L, i, j, 0, 7)–PR(L, i, j, 7, 7) to the southern neighbor processors, actual processors A(L i+1, j, 0)–A(L, i+1, j, 7) on the integrated circuit chip IC(L, i+1, j), for i being an even value or to the northern neighbor processors A(L, i−1, j, 0)–A(L, i−1, j, 7) on the integrated circuit chip IC(L, i−1, j) for i being an odd value.

The south communication circuit SC(5, 1, 1) is an eight bit shift register with the shift register including eight cells or stages SCC(5, 1, 1, 0)–SCC(5, 1, 1, 7). Each of these cells or stages is associated with one of the eight actual processors on the integrated circuit chip IC(5, 1, 1) with the stages SCC(L, i, j, k) being associated with the actual processor A(L, i, j, k), e.g., the stage SCC(5, 1, 1, 0) is associated with the actual processor A(5, 1, 1, 0).

The contents of the eight data cells in the south communication circuit SC(5, 1, 1) are supplied as inputs to the multiplexors of the propagate registers associated with the actual processors of Level 5. For each k from 0 to 7, the contents of the shift register cell SCC(5, 1, 1, k) is made available to the multiplexor of the propagate register PR(5, 1, 1, k). Also, the eight data cells or stages SCC(5, 1, 1, 0)—SCC(5, 1, 1, 7) of the south communication circuit SC(5, 1, 1) can be written to by the actual processors A(5, 1, 1, 0)–A(5, 1, 1, 7), respectively. The actual processor A(L, i, j, k) is able to write to the register cell SCC(5, 1, 1, k). In both cases, this occurs in accordance with instructions from the local chip controller PLA(5, 1, 1). The multiplexor selects the south communication circuit for input in accordance with PLA(5, 1, 1) output signals B2, B1, and B0. Outputs are made to the south communication circuit under control of the PLA(5, 1, 1) output signal S.

With reference to FIG. 7(a), assuming that each major clock cycle of the pyramidal processing system includes eight minor cycles, the last row to be acted upon by the actual processors of the integrated circuit chip IC(5, 1, 1) will be row 7, the south-most row of unit cells associated with the actual processors on the chip IC(5, 1, 1). Prior to executing an instruction upon values of the unit cells of this south-most row, the contents of the shift register cells SCC(5, 1, 1, 0)–SCC(5, 1, 1, 7) of the south communication circuit SCC(5, 1, 1) correspond to the data read out from the actual processors A(5, 0, 1, 0)–A(5, 0, 1, 7) of the integrated circuit chip IC(5, 0, 1) immediately to the south on minor cycle 7 of the previous instruction. This data is fed to the processors A(5, 1, 1, 0)–A(5, 1, 1, 7) as data values associated with the unit cells immediately to the south of the unit cells being operated upon by the actual processors A(5, 1, 1, 0)–A(5, 1, 1, 7), respectively, by transferring the data in the shift register cells SCC(5, 1, 1, 0)–SCC(5, 1, 1, 7) to the appropriate locations in the propagate shift registers PR(5, 1, 1, 0)–PR(5, 1, 1, 7) by means of the propagate register multiplexors. This transfers the south neighbors of the unit cells to the appropriate actual processors.

The results of the write operation into the propagate registers PR(5, 1, 1, 0)–PR(5, 1, 1, 7) on minor cycle 7 are simultaneously written into the south communication circuit cells SCC(5, 1, 1, 0)–SCC(5, 1, 1, 7) under control of the output signal S of the PLA(5, 1, 1), in order to provide this data to the integrated circuit chip IC(5, 0, 1) immediately to the south of the integrated circuit chip IC(5, 1, 1). On each of the other seven minor cycles of the instruction, the contents of the south communication circuit SC(5, 1, 1) are shifted one stage. As evident from FIG. 7(a), the south communication circuit SCC(5, 1, 1) has an input from the integrated circuit chip immediately adjacent to the south, IC(5, 0, 1) and an output to that same integrated circuit chip. The input to SC(5, 1, 1) corresponds to the output of the south communication circuit on that chip, SC(5, 0, 1), while the output of SC(5, 1, 1) corresponds to the input of the south communication circuit SC(5, 0, 1).

Figure 7B:
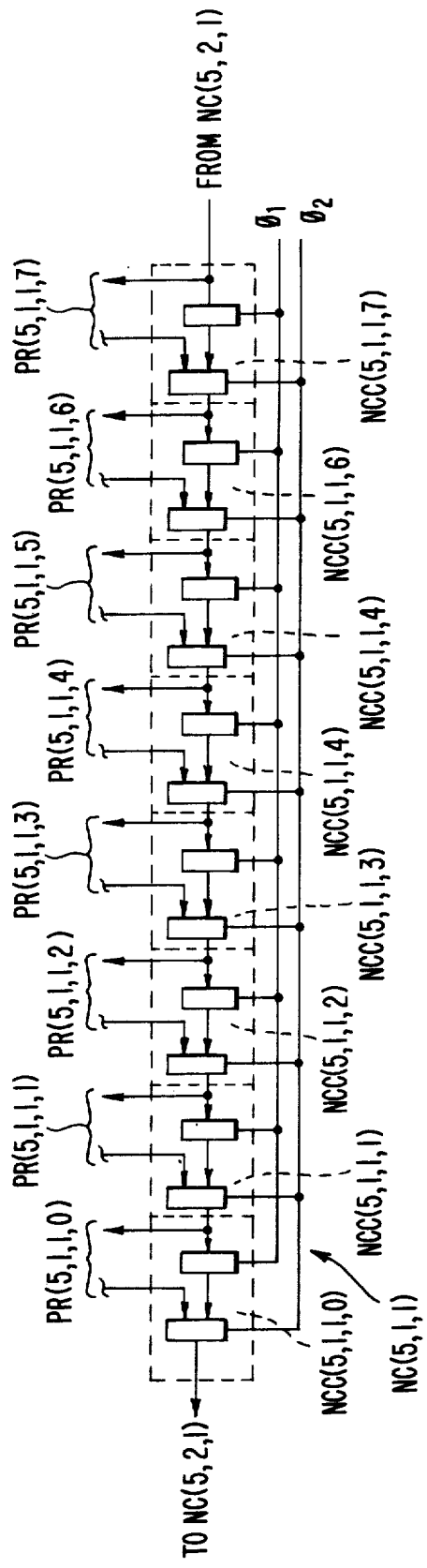
FIG. 7(b) is an illustration of the south communication circuit used at Level 5 of the pyramidal processing system of FIG. 2.

The north communication circuit illustrated in FIG. 7(b) operates similarly, providing communications with the integrated circuit chip immediately adjacent to the north, on minor cycle 0. In this case, the north communication circuit NC(5, 1, 1) of the integrated circuit chip IC(5, 1, 1) provides bidirectional data transfer with the integrated circuit chip IC(5, 2, 1) to provide data required by the actual processor A(5, 1, 1, 0) when processing the neighborhood of propagate register cells PR(5, 1, 1, 0, 7)–PR(5, 1, 1, 7, 7) and the actual processor A(5, 2, 1, 0) when processing the neighborhood of propagate register cells PR(5, 2, 1, 0, 0)–PR(5, 2, 1, 7, 0).

In more general terms, the results of a write operation into the propagate registers PR(L, i, j, 0)–PR(L, i, j, 7) on minor cycle 7 are simultaneously written into the south communications circuit cells SCC(L, i, j, 0)–SCC(L, i, j, 7) under control of PLA (L, i, j) output signal S, in order to provide the data to the integrated circuit chip IC(L, i+1, j) or IC(L, i−1, j) immediately to the south or north of the integrated circuit chip IC(L, i, j). On each of the other seven minor cycles of the instruction, the contents of the south communication circuit SC(L, i, j) are shifted one stage. The south communication circuit SCC(L, i, j) has an input from the integrated circuit chip immediately adjacent to the south, IC(L, i, j) and an output to that same integrated circuit chip. The input to SC(L, i, j) corresponds to the output of the south communication circuit on that chip, SC(L, i+1, j), while the output of SC(L, i, j) corresponds to the input of the south communications circuit SC(L, i+1, j) for i being an odd value.

The north communication circuit operates similarly, providing communications with the integrated circuit chip immediately adjacent to the north, on minor cycle 0. In this case, the north communication circuit NC(L, i, j) of the integrated circuit chip IC(L, i, j) provides bidirectional data transfer with the integrated circuit chip IC(L, i, j) to provide data required by actual processors A(L, i, j, k) when processing the neighborhood of propagate register cells PR(L i, j, 0, 0)–PR(5, 1, 1, 7, 0) and actual processors A(L, i−1, j, k) when processing the neighborhood of propagate register cells PR(L, i−1, j, 0, 0)–PR(L, i−1, j, 7, 0) for i being an odd value.

Figure 8A:
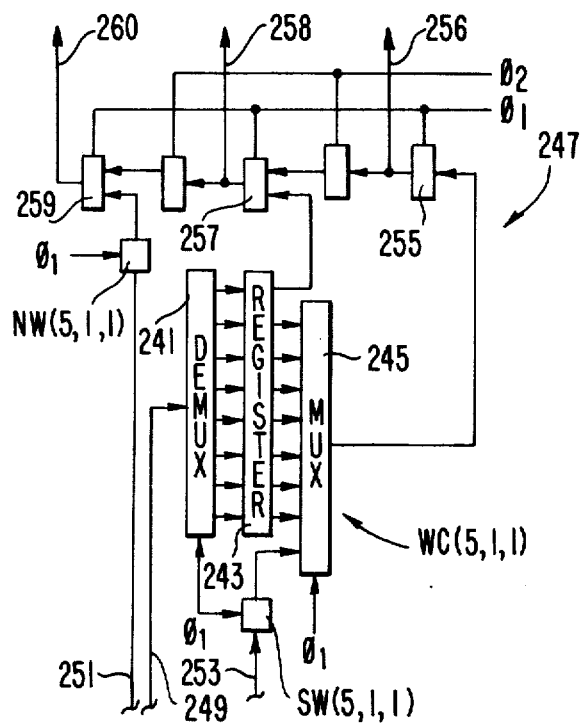
FIG. 8(a) is a schematic illustration of the west communication circuit used at Level 5 of the pyramidal processing system of FIG. 2.

FIG. 8(a) illustrates an embodiment of the west communication circuit WC(5, 1, 1) shown in FIG. 5(a). As stated with respect to FIG. 5(a), the west communication circuit WC(5, 1, 1) is provided for the transfer of data elements from the propagate register cells PR(5, 1, 0, 7, 0)–PR(5, 1, 0, 7, 7) stored in the propagate register PR(5, 1, 0, 7) associated with the actual processor A(5, 1, 0, 7) located on the integrated circuit chip IC(5, 1, 0) to the actual processor A(5, 1, 1, 0) located on an integrated circuit chip IC(5, 1, 1) laterally adjacent within Level 5.

As shown in FIG. 8(a), the west communication circuit WC(5, 1, 1) comprises a demultiplexor 241, a storage register 243, a multiplexor 245, and a shift register 247 similar to those of the propagate register PR(5, 1, 1, 0) as described above. In addition, the west communication circuit WC(5, 1, 1) includes two one-bit storage registers labelled NW(5, 1, 1) and SW(5, 1, 1) for storage of information provided by the northwest and southwest neighbors of the integrated circuit chip IC(5, 1, 1), that is integrated circuit chips IC(5, 2, 0) and IC(5, 0, 0), respectively.

The input to the demultiplexor 241 is provided by an input terminal 249, receiving data from the neighboring chip IC(5, 1, 0). This data is the content of the propagate register PR(5, 1, 0, 7) associated with the actual processor A(5, 1, 0, 7). Each data element to be written into the propagate register PR(5, 1, 0, 7) of the actual processor A(5, 1, 0, 7) is simultaneously and in parallel made available to the input terminal of the west communications circuit WC(5, 1, 1) of the chip IC(5, 1, 1).

The west communication circuit WC(5, 1, 1) also includes input terminals 251, 253 for the storage registers NW(5, 1, 1) and SW(5, 1, 1), respectively. The signal supplied to the terminal 251 for the register NW(5, 1, 1) is provided by the actual processor A(5, 2, 0, 7). The signal supplied to the terminal 253 for the register SW(5, 1, 1) is provided by the actual processor A(5, 0, 0, 7). These storage registers are loaded under control of the local chip controller PLA(5, 1, 1) output signals N and S, respectively.

The outputs of the demultiplexor 241 are supplied as inputs to the storage register 243, under control of the local chip controller PLA(5, 1, 1). The demultiplexor 241 is capable of selectively writing its contents to any of eight storage cells in the storage register 243, as determined by the local chip controller PLA(5, 1, 1) output signals B2, B1, and B0.

The contents of the storage register 243 are selectively transferred by the multiplexor 245 to the first shift register stage 255 of the shift register 247. The multiplexor 245 is capable of selecting any of the last seven storage cells of the storage register 243 or the contents of the southwest communication circuit SW(5, 1, 1), for transmission to the first shift register stage 255 of the shift register 247. This is performed under control of the local chip controller PLA(5, 1, 1) output signals B2, B1, and B0.

The contents of the first cell of the storage register 243 can be loaded directly into a second shift register stage 257, and the contents of the northwest communication circuit NW(5, 1, 1) can be loaded directly into a third shift register stage 259 of the shift register 247. These operations are also performed under control of the local chip controller PLA(5, 1, 1) output signals N and S.

In more generalized terms, the west communication circuit WC(L, i, j) includes two one-bit storage registers labelled NW(L, i, j) and SW(L, i, j) for storage of information provided by the northwest and southwest neighbors of the integrated circuit chip IC(L, i, J), that is integrated circuit chips IC(L, i−1, j−1) and IC(L, i+1, j−1), respectively for even rows, or FC(L, i+1, j−1) and FC(L, i−1, j−1), respectively, for odd rows.

Moreover, the west communication circuit WC(L, i, j) also includes input terminals for the storage registers NW(L, i, j) and SW(L, i, j), respectively. The signal supplied to the terminal for the register NW(L, i, j) is provided by the actual processor A(L, i−1, j−1, 7) for i even or A(L, i+1, j−1, 7) for i odd. The signal supplied to the terminal for the register SW(L, i, j) is provided by the actual processor A(L, i+1, j−1, 7) for i even, or A(L, i−1, 7) for i odd.

There is, in addition, an east communication circuit EC(L, i, j) constructed in direct analogy to the west communication circuit WC(L, i, j) for each integrated circuit chip IC(L, i, j). For example, the integrated circuit chip IC(5, 1, 1) includes an east communication circuit EC(5, 1, 1) illustrated in FIG. 8(b).

A father communication subsystem FC(L, i, j, k) is utilized by an integrated circuit chip IC(L, i, j) to obtain father context for pattern match operations by the actual processors A(L, i, j, 2k) and A(L, i, j, 2k+1). This data is obtained from actual processor A(L−1, i div 2, j div 2, (j mod 2) * 4+k). On each major cycle, four values will be intercepted by the demultiplexor and placed in the father input transmission register FR(L, i, j, k, l). The four values to be intercepted by a father communication subsystem are determined by whether i is odd or even; the values are PR(L−1, i div 2, j div 2, (j mod 2) * 4+k, (i mod 2) * 4) through PR(L−1, i div 2, j div 2, (j mod 2) * 4+k, (i mod 2) * 4+3). This will obtain the father context for the virtual processors associated with actual processors A(L, i, j, 2*k) and A(L, i, j, 2*k+1).

On minor cycle 0 of an instruction, the father input data is transferred from the father input transmission register to the father storage transmission register. From there it is made available to the appropriate actual processors on the appropriate minor cycles to provide father context in pattern match operations. The input transmission register demultiplexor is controlled by the local chip controller PLA outputs F0 and F1, transfer to the storage transmission register is controlled by PLA output N, and the storage transmission register output multiplexor is controlled by PLA output signals B2 and B1. Input transmission register loading is enabled by the condition (Odd = B2).

Figure 9:
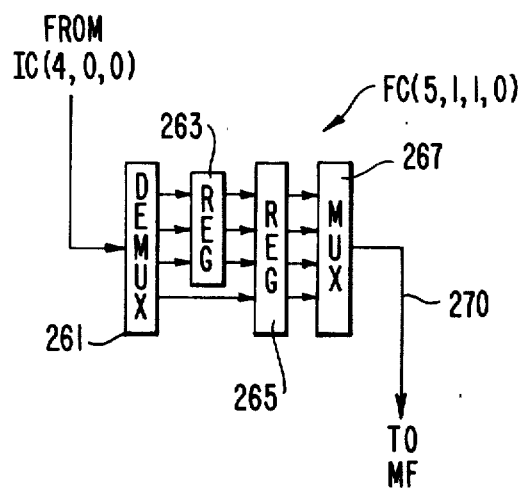
FIG. 9 is an illustration of a father communication circuit used at Level 5 of the pyramidal processing system of FIG. 2.

As an example, the father communication circuit FC(5, 1, 1, 0), shown in FIG. 9, comprises a demultiplexor 261 receiving as inputs the data elements stored in the propagate register cells PR(4, 0, 0, 4, 4), PR(4, 0, 0, 4, 5), PR(4, 0, 0, 4, 6), and PR(4, 0, 0, 4, 7) of the propagate register PR(4, 0, 0, 4) associated with the Level 4 actual processor A(4, 0, 0, 4).

As discussed above, the Level 4 processor A(4, 0, 0, 4) has associated therewith eight Level 4 data elements. In addition, each of the Level 4 data elements has associated therewith four Level 5 data elements (sons) arranged in a two by two matrix. Since each of the Level 5 actual processors A(5, 1, 1, 0)–A(5, 1, 1, 7) also has associated therewith eight Level 5 data elements in separate one by eight matrices, the eight Level 5 data elements associated with the Level 5 actual processor A(5, 1, 1, 0) constitute one half of four two by two matrices. Thus, the eight Level 5 data elements associated with the Level 5 actual processor A(5, 1, 1, 0) are associated in pairs with the four Level 4 data elements stored in the propagate register PR(4, 0, 0, 4) of the Level 4 actual processor A(4, 0, 0, 4).

The four Level 4 data elements associated with the Level 4 actual processor A(4, 0, 0, 4) are transferred in series to the input of the demultiplexor 261. From the demultiplexor 261 the Level 4 data elements are selectively transferred into the data transmission registers 263, 265. An output multiplexor 267 is connected to the output of the data transmission register 265 to transfer Level 4 data elements selectively from the Level 4 processor P(4.0, 0, 4) to the level 5 actual processors A(5, 1, 1, 0) and A(5, 1, 1, 1). In essence, the father communication circuit FC(5, 1, 1, 0) comprises a serial-to-parallel converter and a parallel-to-serial converter.

The father communication circuits FC(5, 1, 1, 1), FC(5, 1, 1, 2), and FC(5, 1, 1, 3) perform similar functions in conjunction with pairs of Level 5 actual processors A(5, 1, 1, 2), A(5, 1, 1, 3); A(5, 1, 1, 4), A(5, 1, 1, 5); and A(5, 1, 1, 6), A(5, 1, 1, 7), respectively. In addition, each of the remaining integrated circuit chips at processing Level 5 have similar father communication circuits for obtaining data elements from the integrated circuit chips at resolution Level 4.

Figure 10:
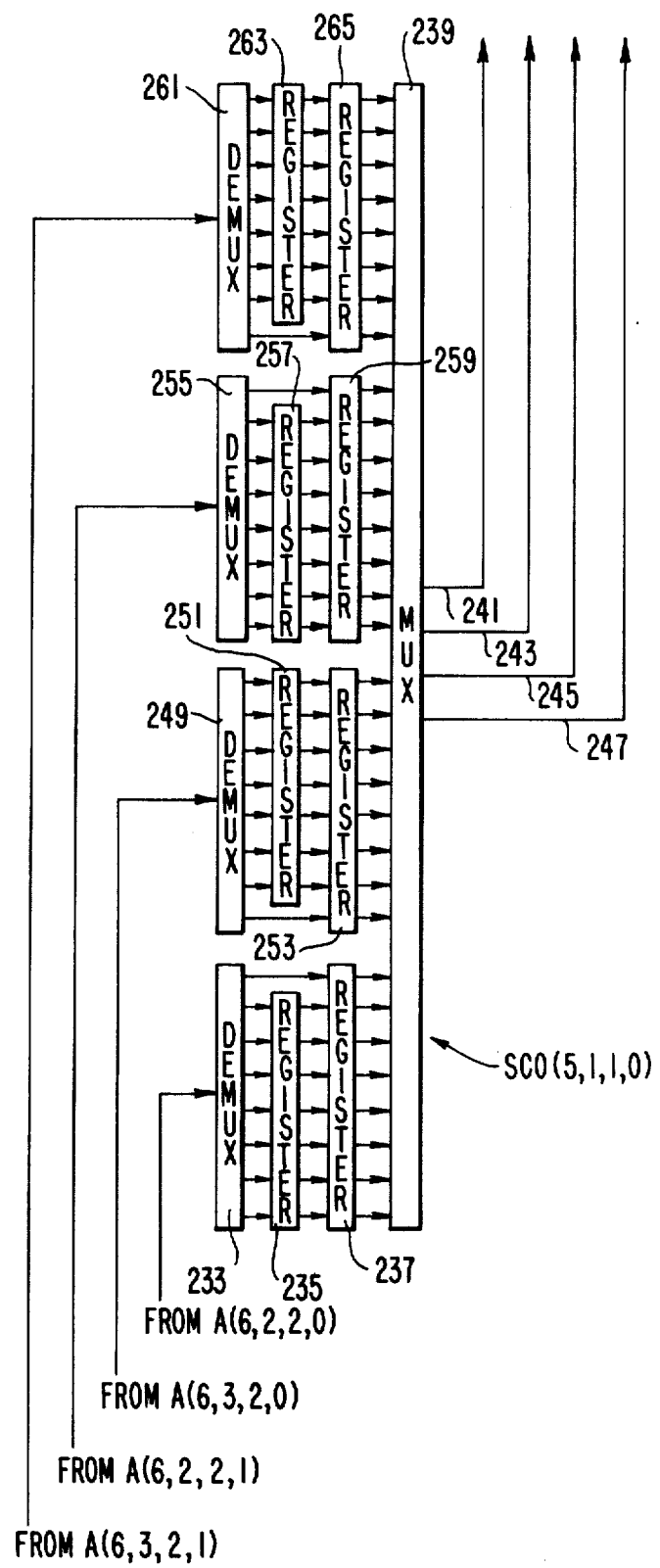
FIG. 10 is an illustration of a son communication circuit used at Level 5 of the pyramidal processing system of FIG. 3.

FIG. 10 illustrates an embodiment of the son communication circuits SC0(5, 1, 1, 0), SC1(5, 1, 1, 0), SC2(5, 1, 1, 0) and SC3(5, 1, 1, 0) (FIG. 5(a)) associated with the Level 5 actual processor A(5, 1, 1, 0). As discussed above, the actual processor A(5, 1, 1, 0) has associated therewith eight Level 5 data elements stored in the propagate register PR(5, 1, 1, 0). Moreover, each of the data elements associated with the actual processor A(5, 1, 1, 0) has four son data elements appropriately stored in Level 6 propagate registers. It is thus evident that means are provided to transfer the 32 Level 6 data elements stored in the register cells of the propagate registers PR(6, 2, 2, 0), PR(6, 3, 2, 0), PR(6, 2, 2, 1), and PR(6, 3, 2, 1) to the actual processor A(5, 1, 1, 0) in order to supply the complete neighborhood for each of the Level 5 data elements associated with the actual processor A(5, 1, 1, 0).

As illustrated in FIG. 10, the four sons of each Level 5 data element or cell is associated with two Level 6 actual processors of the pyramidal processing unit. For example, the Level 5 unit cell U(5, 8, 8) stored in the second register cell PR(5, 1, 1, 0, 0) of the propagate register PR(5, 1, 1, 0) will have four sons, the unit cells U(6, 16, 16), U(6, 16, 17), U(6, 17, 16) and U(6, 17, 17). Two of these Level 6 unit cells are stored as data elements in cells PR(6, 2, 2, 0, 0) and PR(6, 2, 2, 0, 1) in the propagate register PR(6, 2, 2, 0) associated with the actual processor P(6, 2, 2, 0), and the other two Level 6 unit cells are stored as data elements in propagate register cells PR(6, 2, 2, 1, 0) and PR(6, 2, 2, 1, 1) in the propagate register PR(6, 2, 2, 1) associated with the actual processor PR(6, 2, 2, 1).

The son communication circuits SC0(5, 1, 1, 0)–SC3(5, 1, 1, 0) illustrated in FIG. 10 enable the transfer of the appropriate Level 6 data elements from the Level 6 processors A(6, 2, 2, 0), A(6, 2, 2, 1), A(6, 3, 2, 0), and A(6, 3, 2, 1) to the actual processor A(5, 1, 1, 0) in the appropriate manner.

As embodied herein, the son communication circuit SC0(5, 1, 1, 0) comprises a serial-to-parallel converter including a demultiplexor 233 receiving as serial inputs the Level 6 data elements stored in the propagate register cells PR(6, 2, 2, 0, 0)–PR(6, 2, 2, 0, 7) of the propagate register PR(6, 2, 2, 0). These data elements are transferred from the Level 6 propagate register cells by the Level 6 processor A(6, 2, 2, 0). The outputs of the demultiplexor 233 are coupled as inputs to a storage register 235 and the contents of the storage register 235 are transferrable to a second storage register 237. A multiplexor 239 selects any of the values stored in the register 237 and supplies them selectively over four output lines to the Level 5 actual processor P(5, 1, 1, 0).

The son communication circuit SC1(5, 1, 1, 0) similarly consists of a demultiplexor 249, a storage register 251, and a storage register 253. The outputs of the storage register 245 are connected as inputs to the multiplexor 259. The son communications circuit SC1(5, 1, 1, 0) transfers the data elements stored in the propagate register cells PR(6, 3, 2, 0, 0)–PR(6, 3, 2, 0, 7) when the local neighborhood of the propagate register cell PR(5, 1, 1, 0) is being operated upon.

The son communication circuit SC2(5, 1, 1, 0) comprises a demultiplexor 255, a storage register 257, and a storage register 259 having outputs coupled as inputs to the multiplexor 239. The son communication circuit SC2(5, 1, 1, 0) transfers the data elements stored in the propagate register cells PR(6, 2, 2, 1, 0)–PR(6, 2, 2, 1, 7).

Finally, the son communication circuit SC3(5, 1, 1, 0) comprises a demultiplexor 261, a storage register 263, and a storage register 265 having outputs connected as inputs to the multiplexor 239. The son communication circuit SC3(5, 1, 1, 0) transfers the data elements stored in the propagate register cells PR(6, 3, 2, 1, 0)–PR(6, 3, 2, 1, 7) to the actual processor A(5, 1, 1, 0).

The illustrated embodiment of the son communication circuits SC0(5, 1, 1, 0)–SC3(5, 1, 1, 0) enables the Level 6 data elements associated with the Level 6 actual processors A(6, 2, 2, 0), A(6, 2, 2, 1), A(6, 3, 2, 0), and A(6, 3, 2, 1) to be serially transferred from Level 6 of the pyramidal data structure to Level 5 of the pyramidal data structure and to the supplied in a selective order to the actual processor A(5, 1, 1, 0). Thus, for any Level 5 data elements stored in the propagate register PR(5, 1, 1, 0) associated with the actual processor A(5, 1, 1, 0) the appropriate Level 6 data elements are transferred to the actual processor A(5, 1, 1, 0) through the son communications circuits illustrated in FIG. 10.

In more generalized terms, the son communication circuits SC0(L, i, j, k)–SC3(L, i, j, k) enable the transfer of the appropriate level L+1 data elements from the level L+1 processors A(L+1, 2*i, 2*j+(k div 4), 2*(k mod 4)), A(L+1, 2*i, 2*j+(k div 4), 2*(k mod 4)), A(L+1, 2*i+1, 2*j+(k div 4), 2*(k mod 4)), and A(L+1, 2*i+1, 2*j+(k div 4), 2*(k mod 4)+1) to the actual processor A(L, i, j, k).

Memory communication will be effected in the following manner. Associated with each actual processor A(L, i, j, k) is a memory buffer on the processor chip. (see FIG. 11) This buffer may be read from or written to by the transient register TR(L, i, j, k). During execution of each pyramidal processing unit instruction, the locations addressed by the address field of the instruction will perform a read-modify-write cycle. During the first phase of the minor cycle for a given row on the chip, the address of the location requested by the instruction, as modified by the timing generator's memory control logic (see FIG. 13(b)), is sent to the memory chip associated with the instruction. This causes the contents of the addressed memory word to be made available to the appropriate memory module. The data is loaded into the module, except in the case of a write instruction with the processor enabled. In this case, the memory module is loaded instead from the transient register. In the case of a read instruction with the processor enabled, the data is simultaneously loaded to the transient register. The data is expected to be stable by the end of the minor cycle, and is latched at that time. The data now in the memory module is now written back out to the same address from which it was obtained, completing the read-modify-write cycle.

The son communication circuits are controlled by the local chip controller PLA output signals B2, B1, B0. The input demultiplexors are programmed as follows.

| B2 | B1 | B0 | SC0, SC1 | SC2, SC3 |
|----|----|----|----------|----------|
| 0  | 0  | 0  | 0        | 7        |

-continued

| B2 | B1 | B0 | SC0, SC1 | SC2, SC3 |
|----|----|----|----------|----------|
| 0  | 0  | 1  | 1        | 6        |
| 0  | 1  | 0  | 2        | 5        |
| 0  | 1  | 1  | 3        | 4        |
| 1  | 0  | 0  | 4        | 3        |
| 1  | 0  | 1  | 5        | 2        |
| 1  | 1  | 0  | 6        | 1        |
| 1  | 1  | 1  | 7        | 0        |

Legend:
B2, B1, B0: Local chip control PLA output signals.
SC0, SC1, SC2, SC3: Storage cell selected by input demultiplexor in appropriate son communication input transmission register.

The output multiplexors are programmed as shown in the following table:

| B2 | B1 | B0 | SC0, SC1 | SC2, SC3 |
|----|----|----|----------|----------|
| 0  | 0  | 0  | 0, 1     | None     |
| 0  | 0  | 1  | 2, 3     | None     |
| 0  | 1  | 0  | 4, 5     | None     |
| 0  | 1  | 1  | 6, 7     | None     |
| 1  | 0  | 0  | None     | 0, 1     |
| 1  | 0  | 1  | None     | 2, 3     |
| 1  | 1  | 0  | None     | 4, 5     |
| 1  | 1  | 1  | None     | 6, 7     |

Legend:
B2, B1, B0: Local chip control PLA output signals.
SC0, SC1, SC2, SC3: Storage cells selected for output to appropriate actual processor as son context.

When performing operations on a given unit cell in the pyramidal data structure, the processor is able to read data from the transient register storage location associated with that unit cell, as well as data from the propagate register storage locations associated with that unit cell and the data unit cells of all of the local neighbors of that unit cell. The results of performing an operation on a given unit cell may be written into the control register, the propagate register, or the transient register associated with that unit cell. In addition, and in parallel with the operation performed by the processor on a unit cell, one bit of data may be read from the external memory to the transient register, or one bit of data may be written from the transient register to the external memory.

Figure 11:
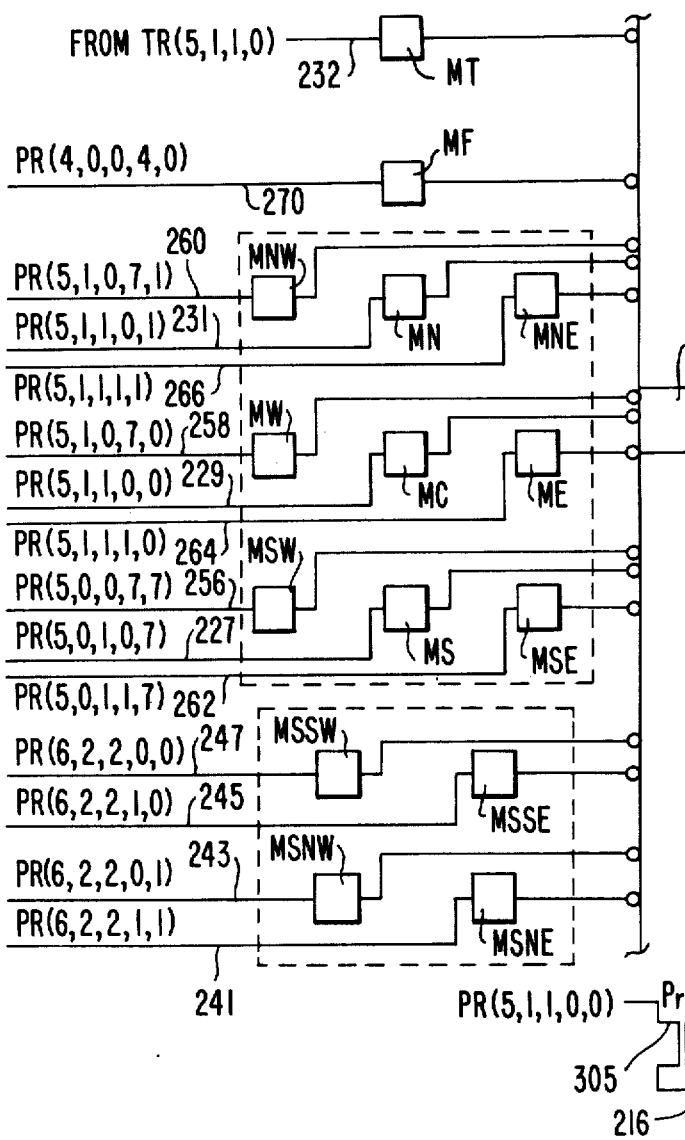
FIG. 11 is an illustration of an embodiment of a Level 5 processor included within the pyramidal processing system of FIG. 2.
Figure 11:
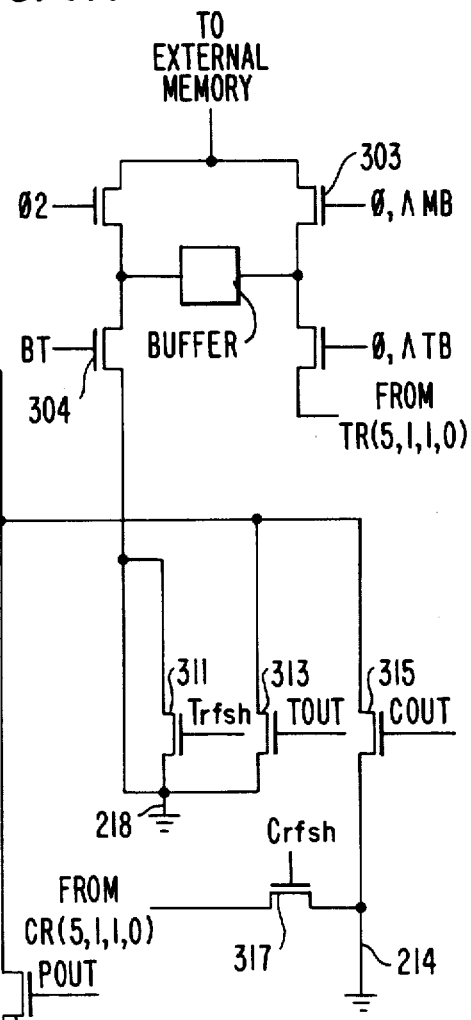

FIG. 11 is a schematic illustration of a processor employed in the pyramidal processing unit 103 of the instant invention. The particular processor illustrated in FIG. 11 is the Level 5 actual processor A(5, 1, 1, 0). The Level 5 actual processor A(5, 1, 1, 0) includes 15 matcher units receiving selective inputs (data elements) and supplying appropriate outputs to the input terminals of a means for logically combining the received data elements. As embodied herein, the combining means is a NOR gate.

The 15 matcher units are selectively controllable to perform logical transformations on the local neighborhood of the actual processor A(5, 1, 1, 0).

Referring to FIG. 11, the actual processor A(L, i, j, k) comprises a matcher unit and a number of data path switches controlled by the local controller PLA(5, 1, 1). The matcher unit is made up of fifteen matcher cells illustrated in FIG. 12, labelled MNW, MNE, MW, MC, ME, MSW, MS, MSE, MSNW, MSSE, MSNW, MSNE, MF, and MT. In general, these are connected to the on-chip registers as follows.

MNW, MW, MSW: Accept as inputs the contents of the three cells of the shift register associated with the propagate register PR(L, i, j, k−1). If k=0, accepts as input the contents of the three cells of the shift register associated with the West communications subsystem WC(L, i, j).

MN, MC, ME: Accept as inputs the contents of the three cells of the shift register associated with the propagate register PR(L, i, j, k).

MNE, ME, MSE: Accept as inputs the contents of the three cells of the shift register associated with the propagate register PR(L, i, j, k+1). If k=7, accept as inputs the contents of the three cells of the shift register associated with the East communications subsystem EC(L,i, j).

MSNW, MSNE, MSSW, MSSE: Accept as inputs the outputs of the multiplexers associated with the son communications circuits SCO(L, i, j, k), SC1(L, i, j, k), SC2(L, i, j, k), and SC3(L, i, j, k), respectively.

MF: Accepts as input the output of the multiplexer associated with the father communications subsystem FC(L, i, j, k div 2).

MT: Accepts as input the output of the T register T(L, i, j, k).

These fifteen matcher units therefore obtain on minor cycle 1 the extended local neighborhood of virtual processor $V(L, 8*i+1, 8*j+k)$ for chips on even rows, and $V(L, 8*i+7-1, 8*j+k)$ for chips on odd rows. Each matcher unit will generate as an output a 0 if either the appropriate ternary digit in the pattern is a don't care specifier (X), or the contents of the appropriate location in the extended neighborhood of the virtual processor is equal to the value of the location in the input pattern. If neither of these conditions is met, the output from the match is a 1.

FIG. 11 illustrates a preferred embodiment of the matcher unit comprising the actual processor A(5, 1, 1, 0). As evident to one skilled in the art, each of the acutal processors, A(L, i, j, k) comprises such a matcher unit. In addition, the matcher units may be constructed differently than the embodiment of FIG. 11 as long as each matcher unit is capable of performing neighborhood transformations.

As shown in FIG. 11, a matcher unit is associated with each of the son data elements and the values stored in the cells of the propagate register cells storing the son data elements are transmitted by the son communications circuits illustrated in FIG. 10. In the example described above, the matcher units associated with the son data elements include a matcher unit MSNE for the northeast son receiving the data element stored in the propagate register cell PR(6, 2, 2, 1, 1) of the propagate register PR(6, 2, 2, 1) associated with the Level 6 actual processor A(6, 2, 2, 1), a matcher unit MSSE for the southeast son receiving the data element stored in the propagate register cell PR(6, 2, 2, 1, 0) of the propagate register PR(6, 2, 2, 1) associated with the Level 6 actual processor A(6, 2, 2, 1), a matcher unit MSSW associated with a southwest son receiving the data element stored in the propagate register cell PR(6, 2, 2, 0, 0) of the propagate register PR(6, 2, 2, 0) associated with the Level 6 actual processor A(6, 2, 2, 0), and a matcher unit MSNW associated with the northwest son receiving the data element stored in the propagate register cell PR(6, 2, 2, 0, 1) of the propagate register PR(6, 2, 2, 0) associated with the Level 6 actual processor A(6, 2, 2, 0).

There are nine local neighborhood matcher units included within the Level 5 actual processor A(5, 1, 1, 0). A matcher unit MC receives the data element or the propagate register cell PR(5, 1, 1, 0, 0) stored in the propagate register PR(5, 1, 1, 0) associated with the Level 5 actual processor A(5, 1, 1, 0). The south local neighbor to the data element stored in the propagate register cell PR(5, 1, 1, 0, 0) is the data element stored in the propagate register cell PR(5, 0, 1, 0, 7) of the propagate register PR(5, 0, 1, 0) associated with the Level 5 actual processor A(5, 0, 1, 0). Since this southern local neighbor is located on a different integrated circuit chip, i.e., IC(5, 0, 1), the data element is transferred to the logic matcher circuit MS by the stage SCC(5, 1, 1, 0) of the south communication circuit SC(5, 1, 1) illustrated in FIG. 7(a).

The local southwest neighbor of the data element stored in the propagate register cell PR(5, 1, 1, 0, 0) comprises the data element stored in the propagate register cell PR(5, 0, 1, 1, 7) of the propagate register PR(5, 0, 1, 1) associated with the Level 5 actual processor A(5, 0, 1, 1). This data element is located on the integrated circuit chip IC(5, 0, 1) and is transferred to the matcher unit MSE through the south communication circuit SC(5, 1, 1) (FIG. 8(b)).

The data element stored in the propagation register storage cell PR(5, 1, 1, 0, 1) comprises the north neighbor and is transmitted to the matcher unit MN from the propagate register PR(5, 1, 1, 0) through the north communication circuit NC(5, 1, 1).

The local northeast neighbor data element of the data element stored in the propagate register cell PR(5, 1, 1, 0, 0) comprises the data element stored in the propagate register cell PR(5, 1, 1, 1, 1) of the propagate register PR(5, 1, 1, 1) associated with the actual processor A(5, 1, 1, 1) located on the same integrated circuit chip, IC(5, 1, 1) as the actual processor A(5, 1, 1, 0). This northeast neighbor is transmitted to the matcher unit MNE through the north communication circuit NC(5, 1, 1, 1).

As explained above, the northwest neighbor data element is the data element stored in the propagate register cell PR(5, 1, 0, 7, 1) of the propagate register PR(5, 1, 0, 7) associated with the actual processor A(5, 1, 0, 7) on the integrated circuit chip IC(5, 1, 0). This northwest neighbor data element is supplied through the register stage 259 from the one bit storage register MNW(5, 1, 1). (FIG. 8a) The output of the register stage 259 is supplied as an input to the matcher unit MNW.

The local west neighbor data element of the data element stored in the propagate register cell PR(5, 1, 1, 0, 0) of the propagate register PR(5, 1, 1, 0) associated with the actual processor A(5, 1, 1, 0) is also located on the integrated circuit chip IC(5, 1, 0) and comprises the data element stored in the propagate register cell PR(5, 1, 0, 7, 0) of the propagate register PR(5, 1, 0, 7) associated with the level 5 actual processor A(5, 1, 0, 7) and is supplied to the input of the matcher unit MW through the shift register stage 257 of the west communication circuit WC(5, 1, 1) illustrated in FIG. 8(a).

The propagate register cell PR(5, 0, 0, 7, 7) of the propagate register PR(5, 0, 0, 7) associated with the Level 5 actual processor A(5, 0, 0, 7) is the southwest neighbor and is supplied to the input of the matcher unit MSW by the register stage 255 of the west communication circuit shown in FIG. 8(a). The southwest data element, as described above, is stored in the one bit register SW(5, 1, 1) of the west communication circuit WC(5, 1, 1).

The local east neighbor data element of the data element stored in the propagate register cell PR(5, 1, 1, 0, 0) associated with the Level 5 actual processor A(5, 1, 1, 0) is located on the same integrated circuit, i.e., IC(5, 1, 1) and comprises the data element stored in the propagate register cell PR(5, 1, 1, 1, 0) of the propagate register PR(5, 1, 1, 1) associated with the Level 5 actual processor A(5, 1, 1, 1) and is supplied to the input of the matcher unit ME through the east communication circuit EC(5, 1, 1).

Figure 8B:
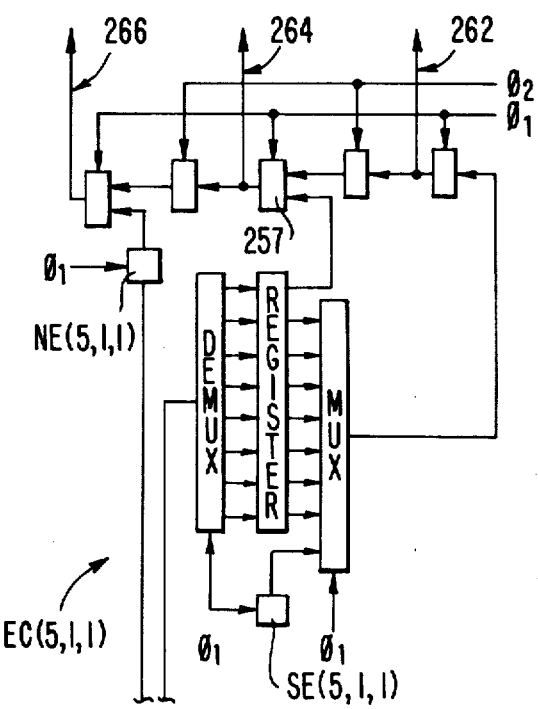
FIG. 8(b) is a schematic illustration of the east communication circuit used at Level 5 of the pyramidal processing system of FIG. 2.

The local northeast neighbor of the data element stored in the propagate register cell PR(5, 1, 1, 0, 0) is the data element stored in the propagate register cell PR(5, 0, 1, 1, 7) of the propagate register PR(5, 0, 1, 1) associated with the Level 5 actual processor A(5, 0, 1, 1) and is applied to the matcher unit MNE by the shift register stage 259 from the register logic circuit MNE through the northeast shift register NE(5, 1, 1) of the east communication circuit EC(5, 1, 1) shown in FIG. 8(b).

A matcher unit MF(4, 0, 0) receives the father data element stored in the propagate register cell PR(4, 0, 0, 4, 0) of the propagate register PR(4, 0, 0, 0) associated with the Level 4 processor A(4, 0, 0, 4). The matcher unit MF(4, 0, 0) receives the value of the data element stored in the propagate register cell PR(4, 0, 0, 4, 0) from the multiplexer 267 of the father communication circuit FC(5, 1, 1, 0) shown in FIG. 9.

An additional input to the functional NOR gate 281 is the data element stored in the transient register cell TR(5, 1, 1, 0, 0) of the transient register TR(5, 1, 1, 0) associated with the Level 5 actual processor A(5, 1, 1, 0).

The instruction multiplexer 417 under the guidance of the control memory 403 selectively controls the programmed logic array module PLA(5, 1, 1) to generate control signals for determining the operation of the matcher units included within the Level 5 actual processor A(5, 1, 1, 0) and the destination of the results of a neighborhood transformation. For example, a control signal MB is generated to control a switch 303 to transmit the current value stored in the stored cell TR(5, 1, 1, 0, 0) of the transient register to the external memory location ICM(5, 1, 1, 0, k).

As described below with reference to FIG. 13(a), the control memory 403 controls the programmed logic array module PLA(5, 1, 1) to generate additional signals for controlling the refreshing of the propagate, transient, and control registers associated with the actual processors. Thus, if it is desired to refresh the value of a data element stored in a storage cell of the propagate register PR(5, 1, 1, 0), the control signal PRFSH is generated by the programmed logic array module PLA(5, 1, 1) and is supplied as an input to a switch 305. This causes, in the example explained above, the current value of the propagate register cell PR(5, 1, 1, 0, 0) of the propagate register PR(5, 1, 1, 0) associated with the Level 5 actual processor A(5, 1, 1, 0) to be transferred to the input terminal of the demultiplexor 215 (FIG. 6) to refresh a value stored in the register 217.

Alternatively, the transformation value generated by the functional NOR gate 281 can be transmitted to the demultiplexor 215 under the control of the control signal POUT generated by the programmed logic array PLA(5, 1, 1). The control signal POUT selectively closes a switch 307 to transmit the output of the functional NOR gate 281 to the signal line 216 for storage in the register 217 through the demultiplexor 215.

The control signal BT generated by the control memory 117 controls a switch 309 to transfer data from the external memory storage location ICM(5, i, j, k) to a transient register associated with a processor. As illustrated in FIG. 11, the control signal BT permits the transfer of data from the memory to the input signal line 218 of the transient register TR(5, 1, 1, 0) through a switch 304. Similarly, the control signals TRFSH and TOUT generated by the programmed logic array module PLA(5, 1, 1) selectively close switches 311 and 313, respectively, to refresh the values stored in the transient register TR(5, 1, 1, 0) or to transfer the output of the functional NOR gate 281 to the transient register TR(5, 1, 1, 0).

The control signal COUT generated by the programmed logic array module PLA(5, 1, 1) selectively closes a switch 315 to transfer the output of the functional NOR gate 281 to the input signal line 214 of the control register CR(5, 1, 1, 0) associated with the Level 5 actual processor A(5, 1, 1, 0).

The current value in the control register CR(5, 1, 1, 0) can be refreshed by the control signal CRFSH generated by the control memory 117 to close the switch 317.

The outputs from the fifteen matcher units are provided as inputs to a NOR gate. The output of this NOR gate is a 1 if and only if all of its inputs are 0. It therefore indicates a match between the pattern and the extended neighborhood of the virtual processor being simulated by the actual processor on the particular minor cycle.

The output of the NOR gate 281 is provided to a set of switches controlling input to the registers PR(L, i, j, k), TR(L, i, j, k), and CR(L, i, j, k). These switches are all controlled by the local PLA chip controller output signals. The switches, identified by the control signal name, are as follows.

Prfsh(L, i, j, k): The previous contents of the second cell in the propagate register are made available to the demultiplexor associated with the propagate register PR(L, i, j, k) as input. This serves to refresh the propagate register.

POUT(L, i, j, k): The results of the pattern match operation described above are made available to the demultiplexor associated with propagate register PR(L, i, j, k) as input. This serves to load the pattern match result into the propagate register.

Trfsh(L, i, j, k): The output of the transient register TR(L, i, j, k) is made available as input to the register. This serves to refresh the contents of the register.

TOUT(L, i, j, k): The results of the pattern match operation described above are made available as input to the transient register TR(L, i, j, k). This serves to load the result of the pattern match into the control register.

Crfsh(L, i, j, k): The output of the control register CR(L, i, j, k) is made available as input to the register. This serves to refresh the contents of the register.

COUT(L, i, j, k): The results of the pattern match operation described above are made available as input to the control register CR(L, i, j, k). This serves to load the result of the pattern match into the control register.

As stated with reference to FIG. 5(b), each integrated circuit chip includes a programmed logic array module PLA(L, i, j). As embodied herein, each PLA(L, i, j) includes nine on-chip programmed logic arrays used for low-level interpretation of chip input signals. These are divided into one PLA for minor cycle counting and father communications subsystem control, and eight PLA's for column register controls, i.e., control of an actual processor and its associated propagate, control, and transient registers. The minor cycle PLA is programmed as follows

| R | B2 | Bi | B0 | B2 | Bi | B0 | N | S | F1 | F2 |
|---|----|----|----|----|----|----|---|---|----|----|
| 0 | 0  | 0  | 0  | 0  | 0  | 1  | 1 | 0 | 0  | 0  |
| 0 | 0  | 0  | 1  | 0  | 1  | 0  | 0 | 0 | 0  | 1  |
| 0 | 0  | 1  | 0  | 0  | 1  | 1  | 0 | 0 | 1  | 0  |
| 0 | 0  | 1  | 1  | 1  | 0  | 0  | 0 | 0 | 1  | 1  |
| 0 | 1  | 0  | 0  | 1  | 0  | 1  | 0 | 0 | 1  | 1  |
| 0 | 1  | 0  | 1  | 1  | 1  | 0  | 0 | 0 | 1  | 0  |
| 0 | 1  | 1  | 0  | 1  | 1  | 1  | 0 | 0 | 0  | 1  |
| 0 | 1  | 1  | 1  | 0  | 0  | 0  | 0 | 1 | 0  | 0  |
| 1 | X  | X  | X  | 0  | 0  | 0  | 0 | 0 | 0  | 0  |

Legend:
R: Chip reset pin
B0, B1, B2: Minor cycle counter
N: North context control (also performs broadside load of P shift register and transfer from input storage buffer to output storage buffer of Father and Son registers)
S: South context control Each of the column control PLA's is further subdivided into three parts, one of each of the propagate, transient, and control registers. The encoding for the propagate and control registers is the same, each of these is as follows:

| Rout | Cen | C | Ro | Rrfsh |
|------|-----|---|----|----|
| X    | 1   | 1 | 0  | 1  |
| 0    | X   | X | 0  | 1  |
| 1    | 0   | X | 1  | 0  |
| 1    | 1   | 0 | 1  | 0  |

Legend:
ROUT: POUT or COUT from instruction
Cen: Cenable from instruction
C: Contents of control register
Ro: Output from processor to propagate or control register
Rr: Refresh propagate or control register The transient register has a slightly more complex encoding, as it performs input and output transactions with the external memory in addition to transfers involving the processor. The transient register encoding is:

| TOUT | Read | Write | Cen | C | TOUT | Trfsh | BT | TB | MB |
|------|------|-------|-----|---|------|-------|----|----|----|
| X    | X    | X     | 1   | 1 | 0    | 1     | 0  | 0  | 1  |
| 0    | 0    | 0     | X   | X | 0    | 1     | 0  | 0  | 1  |
| 1    | 0    | 0     | 0   | X | 1    | 0     | 0  | 0  | 1  |
| 1    | 0    | 0     | 1   | 0 | 1    | 0     | 0  | 0  | 1  |
| 0    | X    | 1     | 0   | X | 0    | 1     | 0  | 1  | 0  |
| 0    | X    | 1     | 1   | 0 | 0    | 1     | 0  | 1  | 0  |
| 1    | X    | 1     | 0   | X | 1    | 0     | 0  | 1  | 0  |
| 1    | X    | 1     | 1   | 0 | 1    | 0     | 0  | 1  | 0  |
| X    | 1    | 0     | 0   | X | 0    | 0     | 1  | 0  | 1  |
| X    | 1    | 0     | 1   | 0 | 0    | 0     | 1  | 0  | 1  |

Legend:
TOUT, Read, Write, Cen: Bits from instruction
C: Contents of control register
TOUT: Processor output to transient register
Trfsh: Refresh T register
BT: Memory buffer to T
TB: Transient register contents to memory buffer
MB: Memory to memory buffer Each of the PLA outputs is ANDed where necessary with a $\phi 1$ or a $\phi 2$ clock pulse to guarantee that signals are provided only on the appropriate phase of a minor cycle.

Control

Figure 13A:
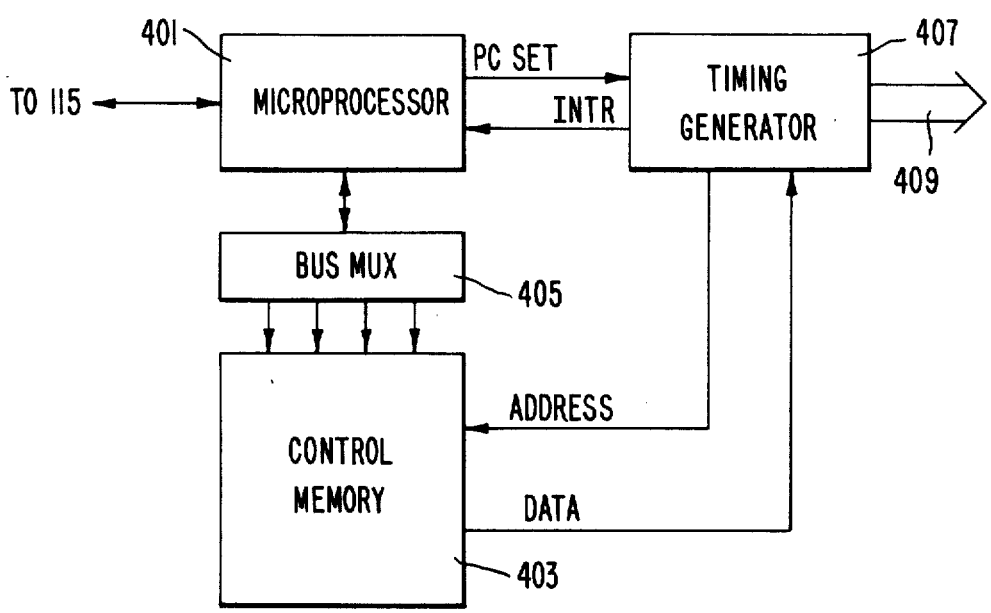
FIG. 13(a) is a block diagram of the control included in the pyramidal processing system of FIG. 2.
Figure 13B:
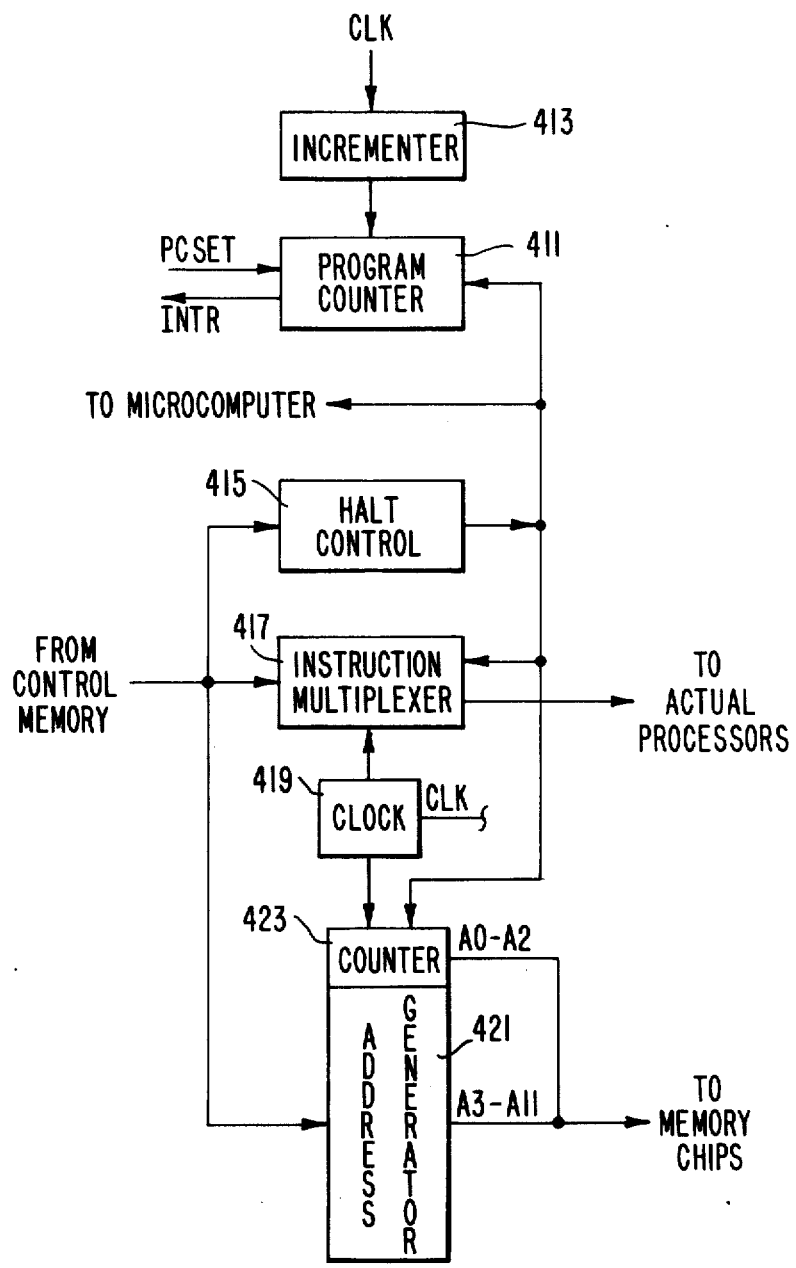
FIG. 13(b) is a block diagram of a timing generator included in the controller of FIG. 13(a).

Control of the pyramidal processing unit is affected by the pyramid controller, illustrated in FIG. 13(a). The controller is constructed of a standard sixteen bit microprocessor 401, such as a Motorola M68000, Intel 8086, or Zilog Z8000, a control memory 403 consisting of 64 kilobytes of read/write memory accessed over a 64 bit bus mux 405, and a timing generator 407. An interface to the system intercommunications circuit is also provided.

The control memory 403 is used both as program and data memory by the microprocessor 401, and as program memory by the pyramidal processing unit. While the control memory 403 has a 64 bit word length, each word is also divided into four sixteen bit subwords which may be individually written. This subword is specified by using fourteen high order bits of the memory address provided by the controller to specifiy one of the 64 bit words of controller memory, and the two low order bits specify one of the four sixteen bit subwords. This encoding enables the microprocessor 401 to make use of the memory in spite of the processor's limited word size.

The pyramidal processig unit 103 makes use of full 64 bit words in the control memory 403. When accessed by the timing generator 407 for use by the pyramidal processing unit 103, each word contains one microinstruction, The word is divided into the following three fields.

- Halt (1 bit): Specifies that the timing generator should halt, interrupt the controller, and begin sending a string of no-operation codes to the pyramdial processing unit.
- Instruction (40 bits): This field specifies an instruction to be performed by the pyramidal processing unit. It is further divided into subfields as specified in the description of the instruction format of the virtual processors.
- Waste: The remaining 23 bits are not used.

The timing generator 407 associated with the pyramidal processing unit generates timing signals to be used in the actual processing of instructions. The timing generator 407, illustrated in FIG. 13(b), consists of a clock 419, a 14 bit program counter 411, an incrementer 413 for the program counter 411, a halt instruction control 415, an instruction multiplexor for communication with the pyramidal processing unit 417, and an address generator 421.

The operation of the timing generator 407 is as follows. Eight minor cycles before the execution of an instruction, the timing generator 407 obtains from the control memory location specified by the program counter 411 a 64 bit word containing a microinstruction in the format specified above. If the halt bit of the instruction is not set, the 31 bits consisting of an instruction for the pyramidal processing unit with the adddress field removed is sent to the instruction multiplexor 417 for transmission to the integrated circuit chips in the pyramidal processing unit.

The instruction is sent in seven transfers (one on each minor cycle) with five bits being sent per transfer. The instruction is transferred five bits at a time in order that a pattern field may be suitably altered for even and odd chip rows (see the description of the pattern encoding, above). Over the following eight minor cycles the instruction is interpreted by each of the actual processors. In this manner, instruction fetch and execution are completely interleaved, with the execution of one instruction occurring concurrently with the transfer of the next.

The address and write fields of the instruction as received from the control memory 403 are supplied to the address generator 421, which controls all of the external memory chips associated with the pyramidal processing unit. While the processing chips are executing the specified instruction, the address generator 421 is used to cause the memory chips to read and write the requested data.

During the course of the instruction, the address generator 421 appends three bits, A0–A2, to the memory address specified in the instruction, in order to uniquely specify the word in the external memory to be used for read and write operations for each of the minor cycles of the instruction. These three bits are generated by a counter 423 and comprise a representation in binary of the current minor cycle.

The remaining bits, A3–A11, of the memory address and bits A0–A2 are transferred to the external memory chips associated with each processing chip to specify an address within the 4096 addresses of the memory chips. This address is sent to all of the memory chips in the pyramidal processing unit 103 at the beginning of the first phase of the minor cycle in which the data will be required. In this way, the data is available for reading when it is necessary.

Concurrently with the multiplexed transmission of the instruction to the processor chips, the program counter 411 is incremented in preparation for obtaining the next instruction.

If the instruction halt bit is set, the halt control 415 inhibits the obtaining and transmitting of instructions as specified above. Instead, an interrupt signal INTR is generated for the microprocessor 401 specifying completion of an instruction sequence, and a series of no-operation instructions is sent from the timing generator 407 to the processor chips. An examination of the pyramid processing unit instructions will show that an instruction consisting of all 0's will serve as a no-operation code.

The microprocessor 401 and the timing generator 407 have a total of three communications paths. First, the microprocessor 401 is able to write into the control memory 403 through the bus multiplexor 405, allowing the memory 403 to generate instructions to be read by the timing generator 407. Second, the microprocessor 401 is able to write to the program counter 411 of the timing generator by transferring the signal PCSET to specify instruction sequences. Third, upon completion of an instruction sequence, the timing generator 407 transmits the signal INTR to interrupt the microprocessor 401, signalling instruction completion. Typically, the control memory 403 will be loaded with a program for the microprocessor 401, plus a library of instructions for the pyramidal processing unit. The microprocessor 401 will execute the program, which includes requests for pyramid operations. A pyramid operation, as interpreted by the microprocessor 401, corresponds to the address within the control memory 403 at which a sequence of pyramid microinstructions begin. A request for the operation is implemented by the microprocesor 401 by setting the program counter 411 of the timing generator. The microprocessor 401 can continue to execute a program in parallel with the execution of the requested pyramid operation within the pyramid. As the microprocessor 401 is able to write in the control memory 403, some instructions, such as pattern matches, may be placed in the library as skeletons which may be filled in by the microprocessor 401 before execution.

Figure 12:
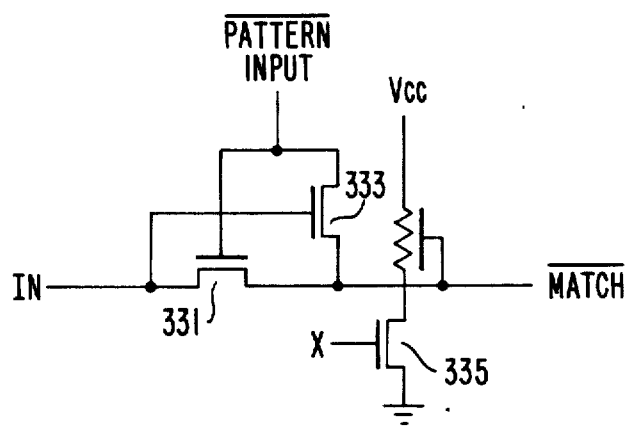
FIG. 12 is an illustration of an embodiment of a logic matcher circuit utilized in the processor embodiment of FIG. 11.

FIG. 12 illustrates an embodiment of the matcher logic circuits utilized in the actual processors A(L, i, j, k) of the instant pyramidal processing system. The control memory 403 supplies pattern match data PATTERN MATCH to the matcher units over the data bus 409. As illustrated in FIG. 12, the inverse values of the data pattern are supplied to the PATTERN INPUT terminal to control the opening and closing of a switch 331. The input to the matcher units is received at a terminal IN which controls the closing of a switch 333. If the value supplied to the terminal IN matches the value of PATTERN INPUT then $\overline{\text{MATCH}}$ is set TRUE. This means that the pattern input data does not match the actual input data to the matcher logic circuit. Conversely, if PATTERN INPUT does not match IN then $\overline{\text{MATCH}}$ is set FALSE signifying that the input data to the logic matcher circuit matches the pattern input data. Finally, the programmed logic array module PLA(5, 1, 1) selectively controls the opening and closing of a switch 335 by means of a control signal X to selectively set the value $\overline{\text{MATCH}}$.

The above description sets forth the structure and method for generating a transformation value of the neighborhood of the data element stored in the propagate register cell PR(5, 1, 1, 0, 0) of the propagate register column PR(5, 1, 1, 0) associated with the actual processor A(5, 1, 1, 0) formed on the integrated circuit chip IC(5, 1, 1). It should be understood that at each minor cycle each actual processor included in each level of the pyramidal processing system is simultaneously performing a neighborhood transformation with regard to the data element stored in the propagate register cell associated with that processor and that minor cycle. In that manner, since in the disclosed embodiment there are eight data elements stored in each propagate register a complete neighborhood transformation encompassing every data element in the pyramidal data structure is performed in the eight minor cycles constituting one major cycle.

It will also be apparent to one of ordinary skill in the art that the operation of each of the processors is variable in accordance with the pattern input signals generated by the controller. In this manner, a local or global neighborhood can be tested for a particular pattern which matches a portion of an object to be identified, can be tested for all black and all white values, or can be processed for numerous other purposes including horizontal, vertical, and diagonal edge detection. Since the pyramidal processing system enables the actual processors within each level to operate in parallel it is possible to execute local and global transformations simultaneously on selected data elements at different levels of resolution within the pyramidal data structure.

It will further be apparent to those skilled in the art, that various modifications and variations can be made to the pyramidal processing system of the instant invention without departing from the scope of the invention and it is intended that the present invention cover the modifications and variations of the system provided that they come within the scope of the appended claims and their equivalents.

What is claimed is:

1. A data processing system for use in processing a pyramidal data structure having a first data level including a first matrix of first level data elements and a second data level including a second matrix of second level data elements greater in number than the first data elements, said system comprising:

first level processing means comprising a plurality of first level processors;

first level memory means comprising a plurality of sets of first level storage devices, each of said first level storage devices including means for storing a different one of said first level data elements and each of said sets of said first level storages devices being coupled tp a different one of said plurality of first level processors;

second level processing means comprising a plurality of second level processors;

second level memory means comprising a plurality of sets of second level storage devices, each of said second level storage devices including means for storing a different one of said second level data elements and each of said sets of said second level storage devices being coupled to a different one of said plurality of said second level processors; and processor control means, electrically coupled to each of said first level processors and each of said second level processors, for generating and sending control signals to said first level processors and said second level processors to cause said first and second level processors to perform processing operations in synchrony upon said first level data elements and said second level data elements, respectively.

2. A data processing system according to claim 1 wherein said first level processors are arranged in rows and columns and wherein said system further includes first level horizontal transfer means for the bidirectional transfer of first level data elements between horizontally adjacent first level processors, and first level vertical transfer means for the bidirectional transfer of first data elements between vertically adjacent first level processors.

3. A data processing system according to claim 2 wherein said second level processors are arranged in rows and columns and wherein said system further includes second level horizontal transfer means for the bidirectional transfer of second level data elements between horizontally adjacent second level processors and second level vertical transfer means for the bidirectional transfer of second level data elements between vertically adjacent second level processors.

4. A data processing system according to claim 3 wherein each of said first and second level processors includes inter-level data element transfer means for electrically connecting a first level processor to a different plurality of second level processors and for transferring first level data elements from said first level processor to said connected second level processors and second level data elements from said plurality of second level processors to said connected first level processors.

5. A data processing system according to claim 4 wherein said processing operations comprises a neighborhood processing operation wherein one of said second level processors processes one of said second level data elements stored in said second level memory means connected therewith together with selected second level data elements associated with horizontally and vertically adjacent second level processors and a selected first level data element stored in said first level memory means connected to said first level processor connected to said one second level processor to a predetermined pattern of data elements.

6. A system according to claim 5 wherein said predetermined pattern of data elements is generated by said processor control means.

7. A data processing system according to claim 6 further comprising memory control means for generating control signals to set selected values in selected ones of said first level storage devices and said second level storage devices.

8. A data processing system for use in processing a pyramidal data structure comprising a first data level comprising a matrix of first level data elements arranged in rows and columns and a second data level comprising a matrix of second level data elements greater in number than the number of first level data elements and also arranged in rows and columns and wherein each of the second level data elements has associated therewith a neighborhood comprising horizontally, vertically, and diagonally adjacent second level data elements and a selected one of said first level data elements, said data processing system comprising:
  first level processing means comprising a plurality of first level processors;
  first level memory means comprising a plurality of sets of first level storage devices, each of said first level storage devices for storing a different one of said first level data elements and each of said sets of first level storage devices being coupled to a different one of said plurality of first level processors;
  a plurality of second level processors;
  second level memory means comprising a plurality of sets of second level storage devices, each of said second level storage devices for storing a different one of said second level data elements and each of said sets of second level storage devices being coupled to a different one of said plurality of said second level processors;
  means for transferring said plurality of said second level data elements and said selected one of said first level data elements comprising said neighborhood of each of said second level data elements to said second level processors coupled to said sets of said second level data elements; and
  means for individually controlling said second level processors to generate in synchrony a transformation value for each of said neighborhoods of each of said second level data elements.

9. A data processing system according to claim 8 wherein said pyramidal data structure further includes a third data level comprising a matrix of third level data elements greater in number than the number of second level data elements and also arranged in rows and columns and wherein said neighborhood of each of the second level data elements further includes a plurality of third level data elements nd wherein said system further includes:
  third level processing means comprising a plurality of third level processors;
  third level memory means comprising a plurality of sets of third level storage devices, each of said third level storage devices for storing a different one of said third level data elements and each of said sets of third level storage devices being coupled to a different one of said plurality of third level processors; and
  second means for transferring said subsets of third level data elements to said plurality of said second level processors for inclusion in said generation of said transformation value for each of said second level data elements.

10. A pyramidal parallel processing system comprising:
  a first processor level including at least one processor, said first level processor having associated therewith first memory means for storing a first data matrix comprising a plurality of first level data elements;
  a second processor level including a plurality of processors coupled in parallel, said second level processors having associated therewith second memory means for storing a second data matrix comprising a plurality of third level data elements, each of said first level data elements and said second level data elements having associated values and each of said second level data elements having associated therewith a neighborhood comprising said second level data element, second level data elements adjacent thereto in said second data matrix, and a selected one of said first level data elements in said first data matrix;
  means for transferring said values of said first level data elements to said plurality of second level processors; and
  means for individually controlling said second level processors to generate in parallel a transformation value for each of said second level data elements corresponding to a function of said values of said second level data elements and said first level data element included in said neighborhood of each of said second level data elements.

11. A parallel processing system according to claim 10 further including:
  a third processor level including a plurality of processors coupled in parallel, said third level processors having associated therewith third memory means for storing a third data matrix comprising a third plurality of third level data elements having associated values, each of said neighborhoods of said second level data elements further including selected ones of said third level data elements; and
  second means for transferring said values of said third level data elements to said plurality of second level processors for inclusion in said generation of said transformation value for each of said second level data elements.

12. A pyramidal parallel processing system according to claim 10 wherein each of said second level processors comprises:
  means individually comparing each of said values of said neighborhood of a said second level data elements to a predetermined value and for generating match output signals corresponding thereto; and
  means for logically combining said match output signals to generate a new value for said second level data element associated with said neighborhood.

13. A pyramidal parallel processing system according to claim 12 wherein said second processor level includes four second level processors and wherein said first transferring means comprises:
  a register having four storage cells;
  a first level demultiplexor having an input terminal for receiving said value of said selected one of said first level data elements and four output terminals singly connected to said register storage cells, said first level demultiplexor for transferring said value of said received first level data element to a selected one of said register storage cells; and a first level multiplexor having four input terminals singly connected to said four register storage cells and an output terminal connected to each of said four second level processors, said first level demultiplexor for selectively transferring the contents of said selected one of said register storage cells to each of said second level processors.

14. A pyramidal parallel processing system according to claim 13 wherein said third processor level includes four third level processors associated with each of said second level processors and wherein said third memory means includes a plurality of third level registers singly associated with each of said third level processors for individually storing said values of said plurality of third level data elements comprising said third data matrix.

15. A pyramid parallel processing system according to claim 14 wherein said second transferring means comprises:
- a plurality of third level demultiplexors singly associated with each of said third level processors, each of said third level demultiplexors having an input terminal for receiving said values of said third level data elements stored in said third level register associated with said third level processor associated with said third level demultiplexor and a plurality of output terminals;
- a third level son communications register including a plurality of third level data cells singly associated with each of said output terminals of said third level demultiplexor; and
- a third level multiplexor having a plurality of input terminals singly coupled to said third level data cells and four output terminals singly coupled to one of said second level processors, said third level multiplexor for selectively transferring said values of said third level data elements stored in said third level data cells to one of said second level processors coupled to said output terminals of said third level multiplexor.

16. A pyramidal parallel processing system according to claim 10 wherein each of said second level data elements is associated with a different one of said second level processors and wherein said second memory means comprises a plurality of second level shift registers singly associated with said plurality of second level processors, each of said second level shift registers for storing the value of said second data element associated with said second level processor associated with said second level shift register.

17. A pyramidal parallel data processing system comprising:
- a first processing level including first level memory means for storing a first level data element having a value associated therewith;
- a first level processor associated with said first level memory means;
- a second processing level including second level memory means for storing a plurality of second level data elements having values associated therewith;
- a plurality of second level processors coupled to said second level memory means, each of said second level data elements being associated with a different one of said second level processors; p1 first level data exchange means for transferring said first level data element to said second level processors; and
- processor control means for individually controlling each of said second level processors to generate in parallel a transformation value for said second level data element associated with said second level processor, said transformation value being a function of the value of said second level data element, selected other second level data elements, and said first level data element transferred by said first level data exchange means.

18. A pyramidal data processing system according to claim 17 further including:
- a third processing level including third level memory means for storing a plurality of third level data elements having values associated therewith;
- a plurality of third level processors coupled to said third level memory means, each of said third data elements being associated with a different one of said third level processors; and
- third level data exchange means for transferring said third level data elements to selected ones of said second level processors such that said transformation value for each of said second level data elements is further a function of said values of selected ones of said third level data elements.

19. A pyramidal processing system according to claim 18 wherein said first level data element comprises a column of N first level pixel values ($N \geq 1$), each of said plurality of said second level data elements comprises a different column of N second level pixel values, and each of said plurality of third level data elements comprises a different column of N third level pixel values.

20. A pyramidal processing system according to claim 19 wherein said plurality of second level processors comprises an array of M second level data processors ($M \geq 1$) and wherein said plurality of said second level data elements comprises an $M \times N$ array of second level pixel values, each of said N first level pixel values corresponding to a different M of said array of second level pixel values.

21. A pyramidal processing system according to claim 20 wherein said plurality of third level processors comprises an $M \times M$ array of third level processors, said third level data exchange means includes connection means for connecting each of said M second level processors to M different third level processors and wherein said plurality of said third level data elements comprises and array of $M^2 \times N$ third level pixel values, each of said second level pixel values corresponding to a different N of said third level pixel values.

22. A pyramidal processing system according to claim 21 further including:
- a plurality of lateral transfer means, each of said lateral transfer means being associated with a different one of said second level processors for transferring said second level pixel values associated with said associated second level processor to another of said second level processors laterally adjacent to said associated second level processor in said array of second level processors.

23. A pyramidal processing system according to claim 22 wherein each of said lateral transfer means comprises:
- a lateral transfer register having a plurality of lateral transfer storage cells;

a lateral transfer demultiplexor having an input terminal connected to said second memory means of said second level processor associated with said lateral transfer means to receive in seriatim said second level pixel values associated with said associated second level processor and a plurality of output terminals singly connected to each of said lateral transfer storage cells, said lateral transfer demultiplexor for selectively transferring said received second level pixel values to said lateral transfer storage cells;

a lateral transfer shift register connected to said laterally adjacent second level processor; and a lateral transfer multiplexor having a plurality of input terminals singly connected to said lateral transfer storage cells and an output terminal connected to said lateral transfer shift register for selectively transferring said second level pixel values stored in said lateral transfer storage cells to said lateral transfer shift register.

24. A pyramidal processing system according to claim 21 further including a plurality of vertical transfer means, each of said vertical transfer means being associated with a different one of said second level processors for transferring said second level pixel values associated with said associated second level processor to another of said second level processors vertically adjacent to said associated second level processor in said array of second level processors.

25. A pyramidal processing system according to claim 24 wherein each of said transfer means comprises a vertical transfer shift register having N register cells for singly receiving and storing said N second level pixel values stored in said second memory means associated with said associated second level processor and an output terminal connected to said vertically adjacent second level processor, said vertical transfer shift register for serially transferring said second level pixel values stored therein to said vertically adjacent second level processor.

26. A pyramidal parallel processing system according to claim 25 wherein each of said second level pixel values has associated therewith a neighborhood of values including said second level pixel value, selected other second level pixel values vertically, laterally, and diagonally adjacent thereto, said corresponding M third level pixel values associated with said second level pixel value, and a selected one of said first level pixel values, and, wherein each of said second level processors comprises:

a matcher circuit for individually comparing said pixel values of a said neighborhood to a predetermined set of test values and for generating corresponding match output signals; and means for logically combining said match outputs to generate a match result signal.

* * * * *